United States Patent [19]
Scranton et al.

[11] Patent Number: 6,099,783
[45] Date of Patent: Aug. 8, 2000

[54] PHOTOPOLYMERIZABLE COMPOSITIONS FOR ENCAPSULATING MICROELECTRONIC DEVICES

[75] Inventors: Alec B. Scranton, East Lansing, Mich.; Bharath Rangarajan, Santa Clara, Calif.; Kiran K. Baikerikar, East Lansing, Mich.

[73] Assignee: Board of Trustees Operating Michigan State University, East Lansing, Mich.

[21] Appl. No.: 09/130,672

[22] Filed: Aug. 7, 1998

Related U.S. Application Data

[63] Continuation-in-part of application No. 08/467,729, Jun. 6, 1995, Pat. No. 5,855,837.

[51] Int. Cl.[7] .......................... B29B 13/08; B29C 35/08; C08F 4/00; C08J 7/06
[52] U.S. Cl. ................. 264/272.11; 264/272.17; 264/494; 264/496; 427/572; 427/519; 522/13; 522/24; 522/43; 522/64; 522/81; 522/83; 522/100; 522/103; 522/170
[58] Field of Search .................. 264/272.17, 272.11, 264/494, 496; 427/213.3, 512, 519; 522/64, 43, 81, 83, 13, 24, 170, 100, 103

[56] References Cited

U.S. PATENT DOCUMENTS

| | | | |
|---|---|---|---|
| 3,653,959 | 4/1972 | Kehr et al. | 361/600 |
| 3,996,602 | 12/1976 | Goldberg et al. | |
| 4,073,835 | 2/1978 | Otsuki et al. | 264/496 |
| 4,329,419 | 5/1982 | Goff et al. | |
| 4,410,612 | 10/1983 | Goff et al. | |
| 4,575,330 | 3/1986 | Hull. | |
| 4,703,338 | 10/1987 | Sagami et al. | 257/788 |
| 4,710,796 | 12/1987 | Ikeya et al. | |
| 4,762,863 | 8/1988 | Sasaki et al. | |
| 4,933,376 | 6/1990 | Sasaki et al. | |
| 4,952,342 | 8/1990 | Drain et al. | 264/494 |
| 4,977,197 | 12/1990 | Sasaki et al. | |
| 5,137,800 | 8/1992 | Neckers et al. | |
| 5,313,365 | 5/1994 | Pennisi et al. | |
| 5,331,205 | 7/1994 | Primeaux. | |
| 5,340,653 | 8/1994 | Noren et al. | |
| 5,340,684 | 8/1994 | Hayase et al. | |

(List continued on next page.)

OTHER PUBLICATIONS

Kosar, J., Light Sensitive Systems, pp. 160–163, 167–169, 175–178, J. Wiley & Sons, 1965.

Goosey, M.T., "Plastic Encapsulation Of Semiconductors By Transfer Moulding," *Plastics for Electronics*, Elsevier Applied Science Publishers, New York, NY, Ch. 5, pp. 137–171 (1985).

Kinjo, N. et al., "Epoxy Molding Compounds As Encapsulation Materials for Microelectronic Devices," *Advances In Polymer Science* 88:1–48 (1989).

Manzione, L.T., "Introduction To Plastic Packaging Of Microelectronic Devices," *Plastic Packaging of Microelectronic Devices*, Van Nostrand Reinhold, New York, NY, pp. 1, 32–33, 64–65, 336–337 (1990).

Tummala, R.R. et al., *Microelectronics Packaging Handbook*, Van Nostrand Reinhold, New York, NY, pp. 1134–1137 (1989).

*Primary Examiner*—Susan W. Berman
*Attorney, Agent, or Firm*—Harness, Dickey & Pierce, P.L.C.

[57] ABSTRACT

A novel method for producing thick composite parts based upon photopolymerizable compositions is disclosed. Also disclosed are novel methods for encapsulation of microelectronic devices based upon novel photopolymerizable compositions. The constituents of the photopolymerizable mixture comprise a monomer or monomers capable of polymerizing by free radical or cationic mechanisms, and a photoinitiator system which possesses an absorbance characteristic which is effectively reduced, or self-eliminating, upon initiation of the polymerization reaction. Parts having thicknesses up to 2 cm and thicker for varying end use applications are made by photopolymerizing such compositions. In addition, using such compositions composite parts can be made using a reinforcement material such as a glass fiber mat present in an amount by weight of from about 5 to about 70%.

28 Claims, 17 Drawing Sheets

U.S. PATENT DOCUMENTS

| | | | |
|---|---|---|---|
| 5,344,600 | 9/1994 | McShane et al. . | |
| 5,557,142 | 9/1996 | Gilmore et al. . | |
| 5,641,997 | 6/1997 | Ohta et al. | 257/788 |
| 5,672,393 | 9/1997 | Bachmann et al. | 427/493 |
| 5,677,362 | 10/1997 | Bachmann et al. . | |
| 5,696,033 | 12/1997 | Kinsman . | |
| 5,739,187 | 4/1998 | Asano et al. . | |
| 5,763,540 | 6/1998 | Nakata et al. . | |

STEP 1

F
STEP 2

STEP 3

STEP 4

STEP 5

PHOTOPOLYMERIZABLE COMPOSITIONS FOR ENCAPSULATING MICROELECTRONIC DEVICES

RELATED APPLICATIONS

The present invention is a continuation-in-part of U.S. Ser. No. 08/467,729, filed Jun. 6, 1995, now U.S. Pat. No. 5,855,837 which is hereby expressly incorporated by reference.

FIELD OF THE INVENTION

This invention relates to parts and, more particularly, to the fabrication of thick, composite parts from readily photopolymerizable compositions.

BACKGROUND OF THE INVENTION

In general, a composite material may be defined as any material containing a reinforcement material which is supported by a binder material. Composite materials thus comprise a two-phase material having a discontinuous reinforcement material phase that is stiffer and/or stronger than the continuous binder (matrix) phase.

Composite materials having a resin binder phase offer substantial advantages over other materials such as metals, alloys and wood. Parts made from composites are thus often much lighter than parts made from steel or other materials, producing tremendous advantages for such composites in terms of the strength to weight ratios. Also, such composites often offer significant advantages over other materials as regards chemical and corrosion resistance and superior physical performance properties such as, for example, tensile properties.

Because of the advantages that may be derived from using composites, such materials have been proposed, and used, for a variety of end use applications ranging from various household products (e.g., bathtubs and shower enclosures) to the transportation industry (e.g., boat hulls and structural components of automobiles). Many of such end use applications require that the part be thick, i.e., at least one-half centimeter in thickness. Parts that can be produced in thicknesses of 0.1 cm or more will satisfy most applications.

Several different fabricating techniques have been developed that may be used to produce composites. One such fabricating technique is resin transfer molding (RTM). RTM may be described, in general, as a process which uses a mechanical pumping apparatus to transfer catalyst and a reactive resin from holding tanks into a closed mold containing a reinforcement material. A variety of reinforcement materials have been used as have various resins, including, for example, unsaturated polyesters, epoxies and vinyl esters. Often, to allow the reinforcement to fit into the mold quickly, the reinforcement is shaped into the desired geometry in a separate operation. The use of such preforms can result in faster cycle times because this eliminates the need for time-consuming placement of the fibers or other reinforcement material at the production press where the composite part is actually fabricated. In addition, these preforms allow for precise control of the fiber placement.

Fabricating composites using RTM has widespread potential because this technology can draw upon the vast amount of technology developed over many years for reaction injection molding (RIM) techniques. Thus, RIM fabrication has been in widespread use for a variety of commercial applications over many years.

However, while RTM has already found extensive application for the low volume production of a variety of specialty products, further developments are required to develop suitable high volume production techniques using RTM. The two fundamental requirements of high volume or mass production are low cost and high speed.

Because the resins actually begin to cure before they enter the mold in RTM fabricating techniques, such resins must meet some rather stringent requirements. The curing resin should exhibit a moderate viscosity plateau while it is still flowing into the mold, but should cure rapidly once the mold is filled.

The fact that the resins in RTM techniques begin to cure before they enter the mold make meeting the requirements of low cost and high speed very difficult. One traditional method to attempt to increase the speed of RTM is to operate the system with increased mold pressures to accommodate more rapid curing rates. Unfortunately, however, the increased operating pressure seems to inevitably result in increased costs due to the more expensive molds and pumping systems that are required to achieve such rapid curing rates.

In addition, there are many technical problems in RTM which arise in the step of filling the mold and impregnating the reinforcement material, such as a preform. The mold filling step can become very complicated since a reacting liquid is being forced through a porous medium (i.e., the preform or other reinforcement material). As this liquid reacts, it becomes more viscous (actually viscoelastic). Indeed, thermoset systems typically exhibit a tremendous increase in viscosity as such systems cure due to branching and cross linking in the system. Due to the moderately high initial (uncured) resin viscosities that increase during reaction, most current RTM processes exhibit significant mold filling problems associated with high operating pressures required to fill the mold and poor resin impregnation into the preform or other reinforcement material.

Even further, displacement and/or compression of the reinforcement material may often occur as the curing resin flows into the mold. Such displacement and/or compression can undermine a major advantage of RTM which is the precise control over the reinforcement material placement. A still further problem which can occur that results in considerable delay and downtime is the gelation of the resin in the transfer lines before entry into the mold. In addition to the problems previously described, further problems in utilizing RTM fabricating methods may arise because the process is typically not isothermal and the mold geometry of the part being fabricated may be highly irregular.

Still further, it has been found that it is important to differentiate flow on the microscale (i.e., within the reinforcement material itself such as a fiber bundle) from flow on a macroscale (e.g., between fiber bundles). It has thus been suggested that microflow improves the wetting and bonding at the reinforcement material (e.g., fiber)/resin matrix interface, and therefore improves the strength of the final composite. The time required for microflow depends upon the viscosity of the penetrating fluid (the reacting resin in RTM), but may be on the order of hours for large parts using commercial resins. RTM has also traditionally been used for encapsulation of semiconductor and other microelectronic devices. U.S. Pat. No. 5,331,205; U.S. Pat. No. 5,344,600; Runyan, W. R. et al., *Semiconductor Integrated Circuit Packaging*, Addison Wesley, Reading, Mass. (1990); Licari, J. J. et al., *Handbook of Polymer Coatings for Electronics*, Noyes Publication, Park Ridge, N.J. (1990); Goosey, M. T., *Plastics for Electronics*, Elsevier, New York, N.Y. (1985); Matisoff, B. S., *Handbook of Electronics*

*Packaging Design and Engineering*, Van Nostrand, New York, N.Y. (1990); Flick, E. W., *Adhesives, Sealants and Coatings for the Electronics Industry*, Noyes Publication, Park Ridge, N.J. (1986); and Buchanan, R. C., *Ceramic Materials for Electronics*, Marcel Dekker, New York, N.Y. (1991). Microelectronic devices are typically encapsulated in a protective thermoset body from which a number of leads extend to allow electrical contact and interconnection between the encapsulated semiconductor device and a printed circuit board. A consequence of the increasingly large number of features on a chip is the use of smaller and finer wires to electrically connect the semiconductor chip to a substrate. These extremely fine wires, which carry electrical signals to the chip, may be easily displaced (wire sweep) or damaged during encapsulation of the chip. If this happens, the device cannot be repaired and must be discarded.

Wire sweep has always been unavoidable during molding, but controlling it is an established challenge in the production of semiconductor devices. Certain factors contribute to the overall difficulty in limiting wire sweep. As stated previously, flowing molding compound exerts a drag force on the wires. If this force exceeds the strength of the wires or of the bonds, then the wires will bend in the direction of the force. Longer wires tend to sweep more easily than shorter wires; therefore, it is desirable to keep the wire lengths as short as possible. However, it is not always possible to keep the wire lengths short. Other constraints in the packaging technology are pushing the wires to longer lengths. It is often necessary to place a small die onto a large die pad or flag; that is, there is more than 0.64 mm clearance, a typical maximum constraint for this dimension, from an edge of the die to the corresponding edge of the flag. Having a die on a flag that exceeds the typical maximum allowable clearance often forces the connecting wires to be longer than desired. There is also a greater risk of sagging wires which would cause shorting in the device if the wires touch the metal flag. Furthermore, some packages are becoming larger in size in addition to having more pin counts. The QFP's (Quad Flat Packages) range in size from 7 mm×7 mm to 40 mm×40 mm. Larger package sizes generally correlate to longer wire lengths because some of the semiconductor die that are placed within these high lead count packages are much smaller than the smallest flag size that can be designed into the leadframe.

Another factor that contributes to the difficulty of controlling wire sweep is the proximity of the wires to each other. The closer the wires are together, the more critical it becomes to limit the wire sweep to reduce the possibility of wires coming into contact with each other. Miniaturization of the geometry of circuit patterns on a semiconductor die is resulting in bonding pads being designed closer together. Moreover, die designers are putting more components on a single die to expands its functions. Increased functionality of each chip results in more I/O's. More output pads and smaller die circuit geometry combine to make the packaging process more difficult because the wires get longer and also placed closer together, both on the semiconductor die and on the leadframe. Increased pin counts force the lead tips on the leadframe to be designed closer together. Some of the QFP's are already in production at 0.4 mm pitch between the leads and some are progressing toward 0.3 mm pitch and smaller.

An additional development in the packaging field that will contribute to the wire sweep problem is the emergence of fine pitched QFP (quad flat package) in molded carrier rings (MCR). The MCR poses a manufacturing problem because the molding process is more complicated than molding non-MCR packages. The MCR and the package can be filled sequentially with the MCR usually being filled first, or they can also be filled at the same time using a different gating configuration. The process window for this operation is very restrictive because the molding compound must be transferred quickly enough to fill both the MCR and the package before the compounds gels but it must also be transferred slowly enough not to cause excessive wire sweep. Because of the tight process window with this type of package, production yield can be affected since any deviation outside the established process window can cause molding rejects due to excessive wire sweep or incomplete filling of the part.

The process of chip encapsulation is important since the chip has already undergone many (perhaps hundreds) processing steps and is just one step away from being a finished product (and thus has considerable value which is lost if the encapsulation step fails). With the current encapsulant transfer molding process, it is very difficult to control the problem of wire sweep in a high pin count, fine pitch package. New trends in die design and packaging pose an increasing challenge to the wire sweep problem. Indeed, due to the continuing advances in device capabilities and rapid changes in circuit board assembly methods, the packaging step is more important than ever before, and may, for the first time, impose limits on the design and performance of the final semiconductor device. Manzione, L. T., *Plastic Packaging of Microeletronic Devices*, Van Nostrand Reinhold, New York, N.Y. (1990).

As indicated, most transfer molding processes suffer from significant problems such as high operating temperatures and pressures required to fill the mold, and poor resin impregnation. Using higher temperatures results in faster cures but often increases the problem of wire sweep. Therefore, current transfer molding processes are plagued by two important problems: i) wire sweep due to the high initial melt viscosity, and ii) inadequate time to fill the mold due to rapid cure (concurrent with mold-filling) at the elevated operating temperatures. As the package sizes and the associated wires shrink to smaller and smaller dimensions, so does the operating window for transfer molding; hence, it is difficult to control wire sweep in the high pin count, fine pitch packages. These problems lead to decreases in productivity due to increased packaging-related rejects in the final processing step, for these new fine pitch microelectronic devices. In addition to the above-mentioned processing limitations, transfer molding operations require expensive molds, which discourages experimentation with new circuit designs and layouts.

In summary, limitations in the use of RTM in high volume production arise from the fact that the resin systems used begin to react before the system enters the mold. This initial reaction thereby creates relatively high viscosities, requires high operating pressures, and results in poor wet-out of the reinforcement material as well as displacement thereof. Additionally, attempts to decrease the cycle time by increasing the operating pressure to accommodate faster reactions may actually exacerbate the problem by decreasing the quality of the composite by affording insufficient time for microflow. Finally, the high capital costs associated with high operating pressures create an inevitable trade-off between high speed and low cost under current RTM technology.

Another technique that may be used for producing thick and complex parts from composites or other materials is hand layup. While quite acceptable for customized applications, this method is obviously extremely labor intensive and offers no potential whatever for high volume or mass production.

Photopolymerizable compositions and technology for using such compositions has been known for many years and has been proposed for a wide variety of applications. As one illustrative example, it has been proposed to utilize certain photopolymerizable compositions including various fillers to form dental compositions. U.S. Pat. Nos. 4,762,863, 4,933,376 and 4,977,197 to Sasaki et al. are patents disclosing suitable photopolymerizable compositions and reinforcing fillers.

Utilizing photopolymerizable compositions to fabricate a thick part can be difficult. Thus, with relatively thick parts, light intensity gradients will typically result, and such gradients can prevent satisfactory curing throughout the thickness of such parts. More particularly, what can often occur is the polymerization of thin layers adjacent to the surface where the light source is positioned. The thickness of this layer is determined by the distance the initiating light may effectively penetrate. Perhaps for this reason, the use of photopolymerizable compositions has been largely directed to forming thin films or coatings. U.S. Pat. No. 5,340,653 to Noren et al. is one example of a free-radical curable composition used as a coating for various substrates.

One possible exception to the use of photopolymerizable compositions for thin films and coatings is U.S. Pat. No. 5,137,800 to Neckers et al. This Neckers et al. patent concerns forming three-dimensional objects by stereolithography using the general method described in U.S. Pat. No. 4,575,330 to Hull. As is disclosed in the '800 patent, a photopolymerizable monomer and a photoinitiator system for the monomer is used in a method that involves directing a ray of activating radiation for the photoinitiator system to and through a point in a given plane and into the body of the composition. The intensity of the activating radiation of the ray or the time during which the ray entering the body is directed through the point is employed to determine the distance through which the ray of activating radiation enters the body to the point of the succession of points to which the ray activates the photoinitiator system that is farthest from the surface.

More particularly, when the three-dimensional polymerizing method is practiced, using a visible light photoinitiator, such as eosin and its derivatives and visible light for activation, it is stated that it is not necessary that the photoinitiator have a peak absorbance at the wavelength of the activating light. All that is required is that there be sufficient absorbance at the wavelength of the activating light to cause the reactions which form the activator and cause the dye to lose its color at the required rates. As is noted, if bleaching occurs too rapidly, by comparison with the rate at which polymer-forming radical formation occurs, radical reactions which do not cause polymerization, e.g., radical coupling, can be expected. It is stated that, if polymerization occurs too rapidly, by comparison with the rate at which bleaching occurs, activating light cannot penetrate the monomer/photoinitiator mixture to a sufficient depth, and polymerization stops on or near the surface through the light enters. Referring to the foregoing working Examples in the '800 patent, Neckers et al. state that the balance was achieved by the selection of certain dyes as photoinitiators, using triethanolamine as an accelerator, and controlling the proportions of the two. In general, it is stated that the photoinitiators are used at extremely low concentrations by comparison with those which have previously been suggested and used, most frequently in curing thin films. On the other hand, it is noted that the concentration of the photoinitiator must be sufficiently high that the induction period is not excessive, and the concentration of the activator and the photon density must both be sufficiently high that the rates of bleaching and polymerization are appropriately matched to achieve polymerization to a desired depth in a photopolymerizable composition. (col. 22, II. 19–58).

This Neckers et al. patent uses a highly focused light source. Thus, certain lasers were used in the methods disclosed in the working Examples. Also, in describing the reaction using a system including trimethylopropane triacrylate with eosin lactone and triethanolamine, and using a beam of visible light from an argon ion laser having a wavelength of 514 nm, Neckers et al. state that the eosin undergoes a reaction with the triethanolamine, producing two moieties, one of which is a free radical which serves as an activator for the polymerization of the trimethylopropane triacrylate. The loss of the dye color also occurs as a consequence of the eosin reaction with the triethanolamine, enabling subsequent radiation from the argon ion laser to penetrate farther into the composition and to cause reaction of eosin with triethanolamine and activation of the trimethylopropane triacrylate at the level of greater penetration, and still greater penetration by subsequent radiation with consequent reaction and activation at the level of the still greater penetration. (col. 2, I. 58 to col. 3, I. 7).

As may be appreciated, producing materials by stereolithography involves rastering a laser beam across the surface of a pool of monomer to form a thin polymeric layer. This polymerized layer is then lowered slightly into the pool of liquid monomer, and fresh monomer flows into its place at the free surface. A second thin layer of polymer is then formed at the free surface, and this second layer adheres to the layer below it. By repeating this process, it is possible to make thick polymeric parts. While stereolithography perhaps may be suitable for some applications such as developing a prototype, the slow process rates make stereolithography unsuitable for large-scale production of polymeric or composite parts.

Despite all of the considerable work in this field, there exists the need for a fabricating method for thick polymeric or composite parts and the like which is amenable to high speed, low cost production. To this end, a principal object of the present invention is to provide a composition suitable for making thick polymeric or composite parts that is amenable to high speed, low cost production and is energy efficient.

A further object of this invention is to provide polymeric or composite parts capable of being made from a variety of monomer/resin systems so as to allow tailoring of the properties to the particular requirements of the end use application.

A still further object is to provide a reactive composition for making thick composites which is characterized by a relatively long shelf life.

Yet another object of the present invention lies in the provision of a facile process which may be utilized to form thick parts by widely varying techniques.

A further object of this invention is to provide an improved process for forming composites utilizing RTM technology and achieving high speed, low cost production capabilities.

A still further object is to provide a method for making polymeric or composite parts which allows decoupling of the mold filling operation from the initiation of the reaction itself together with the attendant advantages thereby achieved. A more specific aspect thus provides an RTM process characterized by the ability to utilize low viscosity monomers, allowing rapid mold filling at low pressures, efficient penetration of the reactive liquid into the reinforcing material without displacement thereof, and the like.

Yet another more specific aspect lies in the elimination of gelation in the respective transfer lines used in a molding system so as to facilitate automation.

There also exists a need for a method for encapsulating microelectronic devices such as semiconductors and capacitors that reduces or eliminates wire sweep and damage to the microelectronic device as well as encouraging development of new circuit designs and layouts while reducing the cost. Thus, a principal object of the present invention is to provide a composite suitable for encapsulating microelectronic devices.

A further object of this invention is to provide a method for encapsulating microelectronic devices that decreases or eliminates damage due to wire sweep during encapsulation.

A still further object of the present invention is to provide a cost-effective method for encapsulating microelectronic devices by reducing production costs and increasing process yields.

Yet another object is to provide a method for encapsulating microelectronic devices that is flexible enough to encourage new circuit designs and layouts by eliminating the need for expensive molds required for RTM processes.

Other objects and advantages will become apparent as the following description proceeds.

SUMMARY OF THE INVENTION

In general, the present invention is predicated upon the discovery that thick polymeric or composite parts can be readily fabricated by utilizing a photopolymerizable composition including a photoinitiator exhibiting a self-eliminating absorbance characteristic. In this fashion, any undue light intensity gradient existing in the part being made can be adequately diminished, or even eliminated, so as to allow effective curing throughout the part thickness. The resulting polymeric or composite part will exhibit the strength and other characteristics indicative of the type of polymer system being utilized. In other words, the strength and other physical characteristics that can be obtained using the present invention can certainly match those achieved using conventional thermal polymerization techniques.

The present invention is versatile, allowing use of many of the monomer systems conventionally used in forming composite parts, such as RTM and the like. Thus, the monomer systems often used in such RTM processes can be used advantageously in the present invention.

Still further, the present invention, in addition to decoupling the mold filling operation from the initiation of the reaction so as to provide the several substantial advantages resulting from such decoupling, provides a facile method with wide processing latitude. The present invention thus provides a method highly amenable to a relatively low cost mass production system. Since the present invention eliminates any need for high pressures or external heating of the mold or die, energy efficiency is provided.

The present invention also provides a method for encapsulating microelectronic devices. The use of a photopolymerizable composition of the present invention decreases or eliminates wire sweep or damage to the device during encapsulation.

As will be discussed in the description which follows, the present invention allows substantial advantages to be achieved in not only RTM process but in other techniques as well. These particular advantages will be more fully described hereinafter.

DETAILED DESCRIPTION OF THE INVENTION

Figure 1A:
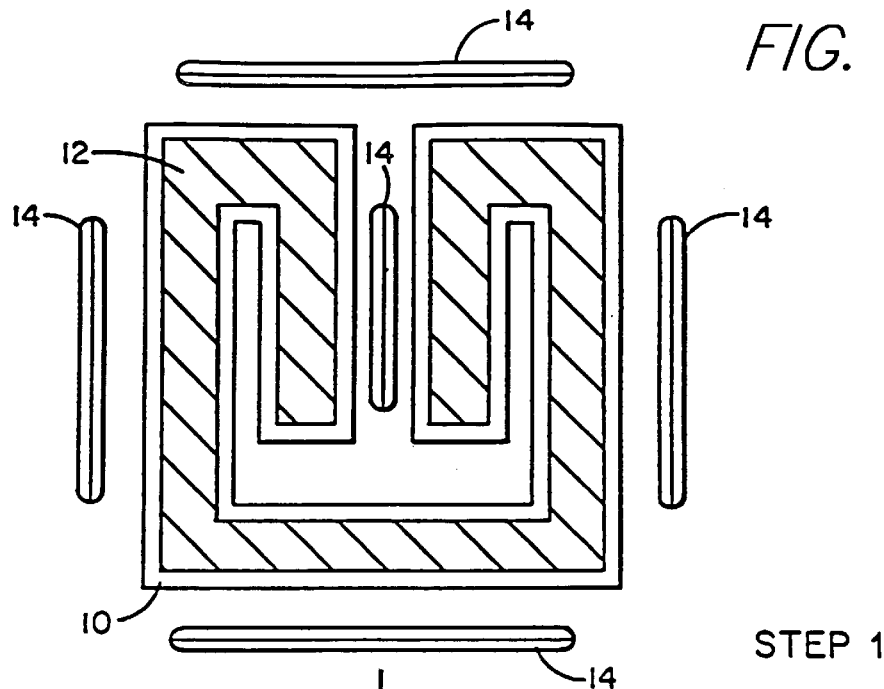
FIGS. 1A–1E are a schematic illustrating a sequential illumination strategy by which the present invention may be utilized to form a part of complex shape with minimal residual stresses.
Figure 1B:
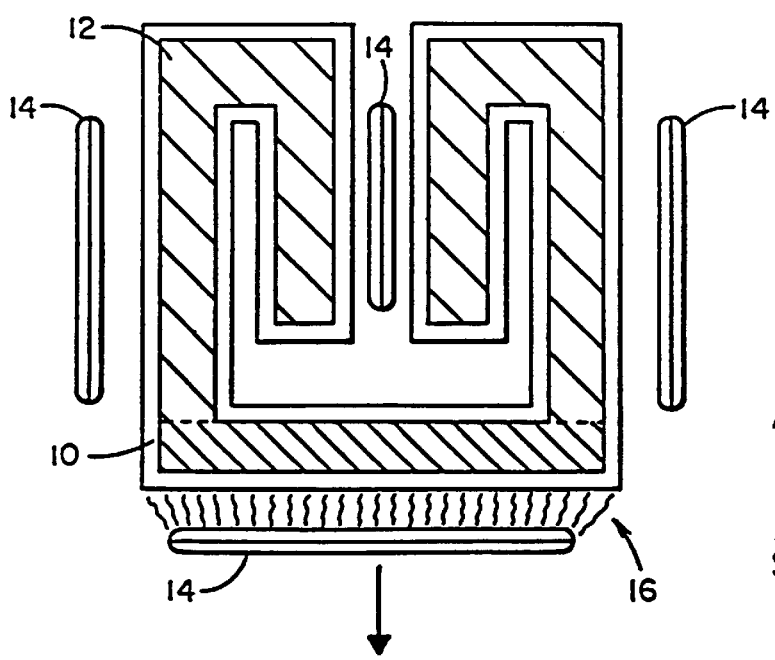

As may be appreciated, the relative percentage and the composition of each of the reinforcement material and the matrix material phase will depend upon factors such as the performance and other requirements of the specific end use application. In general, for applications requiring composites with relatively high mechanical properties, the reinforcing material may make up as much as about 60 or 70% or even more based upon the total weight of the composite. On the other hand, in applications where relatively high mechanical properties are unnecessary, the reinforcement material may comprise only about 5% to 10% based upon the total weight of the composite, perhaps even less. In addition, if the fiber or other reinforcement material is unnecessary or unwanted for a particular application, the invention may be used with neat systems containing no fiber.

As regards the materials used for reinforcement, a wide variety of such materials are known in the art and may be utilized. As representative examples of the type of reinforcement materials that are useful, representative useful materials include chopped E-glass fibers ranging from fine powders to long fibers.

Still further, in making composites by prior art techniques, useful types of reinforcement are often termed as chopped strands, chopped strand mats, woven roving (e.g., a coarse, heavy fabric made up of long, continuous glass fiber strands), biaxial mats, continuous strands and unidirectional mats. All of these types of reinforcement can be utilized in the present invention. In addition, fillers and viscosity-enhancers such as powdered silica, fumed silica, glass beads, and microspheres may be used with the present invention.

The thickness of the composite part which may be fashioned in the process of the present invention may be affected by the light scattering caused by the presence of the reinforcement material. Such an effect can be at least minimized, if not essentially eliminated, by utilizing reinforcing materials and monomers (as well as the resulting polymers in the particular system) that have refractive indices which are the same or at least quite similar to each other. Similarly, in those applications where this can be accomplished, orienting the reinforcement material, for example, fibers, in a direction generally parallel to that of the travel of the light, should also minimize the effects of light scattering.

As to the matrix or binder phase, any one of a wide variety of monomers capable of being polymerized via radical or cationic reactions may be used. As an illustrative example, one family of useful resins are the DERAKANE epoxy vinyl ester resins (Dow Chemical Co., Midland, Mich.). Such resins are presently commercially used to fabricate a wide range of corrosion-resistant composites by conventional fabricating techniques. Several resins in this family of varying viscosities have been utilized in the present invention and have performed satisfactorily. Specific illustrative examples of members of this product family which have been utilized include the following: 411c-50, 441-400 and 470-45. It is thus preferred to utilize such DERAKANE epoxy vinyl ester resins in the method and composites of the present invention.

However, and while less preferred, acrylates and other monomers may be used if desired for a particular application, either alone or with other resins such as the DERAKANE resins. Any of a wide variety of acrylates, as well as vinyl ethers, vinyl esters, and styrenics, are commercially available and may be used.

Indeed, the principal requirements for the monomers utilized to form the matrix material are that the monomer should not have unduly facile extractable hydrogens so as to adversely affect the photoinitiation sequence as will be discussed hereinafter. In addition, the monomer and the resulting polymer should have minimal or no absorbance in the wavelength range where photoinitiation is taking place.

In addition to the types of resins previously described, there are many monomers that are known which can satisfy these principal requirements; and these monomers can be used in the present invention. As may be appreciated, the utility of any monomer for use in this invention can be determined quite readily, i.e., by testing use in the contemplated system.

In accordance with one aspect of the present invention, a photoinitiator is utilized which possesses the requisite self-eliminating absorbance characteristic to make the particular composite part. Thus, it has been found that certain types of photoinitiators which are effective in the ultraviolet wavelength range exhibit an absorbance which rapidly decreases over a period of time so as to allow penetration of emitted light throughout a thickness of 1 to 2 centimeters or so.

The self-eliminating absorbance characteristic is thus defined as an ever-decreasing absorbance of initiating light over a period of minutes so that a part having a thickness of at least 0.1 centimeter can be cured in a few minutes or less while achieving a part having the principal physical performance characteristics essentially the same as obtained using the same resin and reinforcing material systems cured via thermal polymerization. More particularly, utilizing the method of the present invention allows preparation of composites which have physical characteristics such as tensile strength and other physical parameters that are equivalent to the physical characteristics which can be obtained with conventional fabricating techniques and will also satisfy the particular performance requirements for a wide variety of applications where thick composite parts are desired.

Useful photoinitiators include benzoin ethyl ether (BEE) and other benzoin ethers, such as, for example, benzoin methyl ether (BME) and benzoin phenyl ether (BPE). While the present invention should not be limited to this explanation, it is hypothesized that the self-elimination of the absorbance of benzoin ethers such as BEE is due to the creation of substantially more radicals via fragmentation than occurs through hydrogen abstraction upon excitation with ultraviolet light in the appropriate wavelength range (i.e. 320–360 nm). The resulting fragmented radicals which are produced are distinct from the original structure of the BEE and do not absorb in the 320–360 nm range in which BEE has substantial absorbance. Accordingly, as the BEE molecules are excited and fragment, the increase in the number of molecules which fragment results in a decreased absorbance in the 320–360 nm region. In this fashion, the ultraviolet light is allowed to penetrate deeper into the part being fabricated.

One representation as to the fragmentation which may occur upon photoexcitation is set forth below:

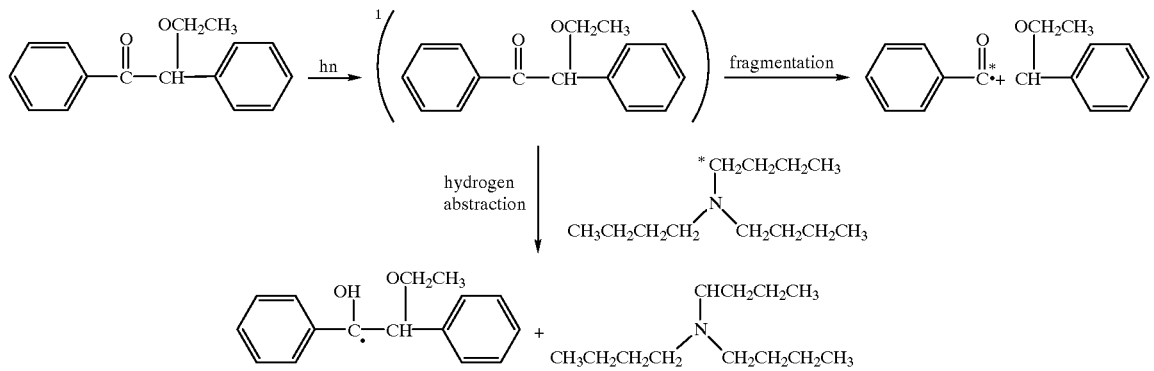

Of course, under this hypothesis, any BEE molecule which produces radicals by hydrogen abstraction may continue to absorb strongly in the 320–360 nm range because the general structure of BEE is essentially maintained. It is believed that the ratio of fragmentation to hydrogen abstraction will depend strongly on the initiator, stability of the fragmented radicals formed, and the relative strength of the hydrogen donor. Additionally, and as has been previously discussed, by avoiding inclusion in the photopolymerizable system of a strong hydrogen donor (as well as avoiding the use of an accelerator, such as triethanolamine), the relative likelihood of hydrogen abstraction occurring during photopolymerization can be minimized.

In view of the photoinitiators which possess the desired characteristic and those (e.g., thiosalicyclic acid) which do not, one can make at least a preliminary prediction as to the suitability of a photoinitiator for use in the present invention, simply based upon the chemical structure of the respective photoinitiator, photosensitizer, or coinitiator. More specifically, the characteristic of a self-eliminating gradient is likely to be found in systems which contain initiators (photoinitiator, photosensitizer, or coinitiator) which have the following characteristics: the initiator system should consist of at least two aromatic rings which are either conjugated or otherwise coupled in such a manner that the resulting molecule has a considerable or continuous π-electronic structure. This excess of π-electrons in the highly coupled aromatic structure enables the molecule to absorb light in the near ultraviolet region of the spectrum. Upon illumination, the excited state of this molecule should initiate either a free radical or an ionic polymerization reaction by electron transfer/photofragmentation. The resultant initiator molecule should lose its characteristic absorbance in the near-UV region of the spectrum due to the loss of the coupled aromatic π structure. Therefore, this method would predict that benzoin ethers such as BEE or BME would produce gradients which would self-eliminate due to the loss of aromatic coupling caused by photofragmentation of the molecule. Furthermore, this method would also predict that compounds such as bis(2,4,6-trimethylbenzoyl) phenylphosphine oxide (BAPO) would also act as a photoinitiator in the present invention. Further, if desired, chemical analysis can be carried out after photoexcitation to determine whether fragmentation has occurred.

However, and regardless of the mechanisms by which the requisite self-elimination of the absorbance occurs, suitability under the desired processing conditions can be determined in a straightforward fashion simply by carrying out the photopolymerization, and then determining the physical characteristics of the resulting composite part. The physical characteristics achieved should be of the same approximate level as those which can be obtained using thermal polymerization with conventional free radical catalysts.

In general, from a functional standpoint, the amount of the photoinitiator in the photopolymerizable system should be enough to achieve satisfactory photopolymerization in the time desired using the other desired process parameters. Additionally, the photoinitiator should not be present in such an excessive amount that does not allow the absorbance of the photoinitiator to self-eliminate at a rate adequate to allow polymerization throughout the thickness of the part being fabricated.

With these criteria in mind, it will be suitable for most applications to utilize an mount of photoinitiator in the range of about 0.01 to about 4% based upon the total eight of photopolymerizable system. However, as may be appreciated, useful mounts can be determined in a straightforward fashion simply by carrying out the photopolymerization under the desired process parameters and then testing the resulting physical characteristics of the part.

As regards the light source, conventional sources of ultraviolet light and the like are well known and may be used. The present invention is highly versatile and does not require any special type of light source. All that is required is that the light source employed provide light in the wavelength range dictated by the particular photoinitiator used. While unnecessary, light in wavelengths outside the desired photopolymerization range for the particular photoinitiator could be filtered out. Still further, the light source employed can emit light to penetrate throughout one or more faces or sides of the composite part being fabricated. A high intensity point-focused light source such as a laser is not required and in many applications would not be useful.

Illustrative examples of useful light sources that can be desirably employed range from low-intensity light sources such as long wave UV lamps as produced by UVP (San Gabriel, Calif.), low intensity arc lamps as produced by Oriel (Stratford, Conn.), high intensity arc lamps (Oriel), lasers, and ultraviolet curing systems available from Fusion Systems Corporation (Rockville, Md.).

The rate of cure will be affected by a variety of parameters, perhaps most significantly by the intensity of the initiating light and the photoinitiator concentration. It has thus been found that increasing the intensity of the initiating light decreases the cure time required. Similarly, increases in the photoinitiator concentration may also decrease the cure time, keeping in mind the upper useful limits of the photoinitiator as have been previously discussed.

The procedure for forming the composite part is quite straightforward. All that is required is a mold for the desired composite having at least one face or side transparent to the initiating light so that the light can penetrate adequately to allow the photopolymerization to take place, a suitable light source, and the desired photopolymerizable composition itself in an amount adequate to fill the mold. The particular sequence of the procedure actually used can vary as desired. For example, inasmuch as the present invention decouples the mold filling operation from the reaction itself, the mold can be filled either before or after the light source being used is turned on.

Nevertheless, as an illustrative example of a particular procedure which may be advantageously used, parts in accordance with this invention can be made in the following manner: (1) if desired to shield the photopolymerizable composition from the thermal effects caused by infrared (IR) light, a filter can be placed in the path of the light source being utilized to protect the composition and/or the mold from direct heat caused by IR light, (2) if it is desired to eliminate any premature initiation of the photopolymerization, a shutter or the like can be placed in the path of the light emitted from the light source, (3) the light source can be turned on or otherwise activated, desirably allowing ample time for the intensity of the light being emitted to reach equilibrium, (4) a mold of a suitable dimension for the composite part can be provided with at least one or more path or paths for the light to transmit through to achieve the desired photopolymerization, (5) if desired, the mold can be coated with a mold release agent or agents so as to promote facile removal of the cured composite from the mold (any mold release agent from among the many known can be used), (6) the reinforcing material can be placed in the mold in the desired location, whether preformed or not (or, if desired, the resin and the reinforcing phases can be mixed together to provide a slurry), (7) the mold can then be filled with either the neat resin or with the slurry, (8) the shutter or the like can be opened or removed to allow the light to illuminate the resin phase; and, after allowing adequate time for the composite to cure, the shutter or the like can be closed so as to cut off the light source from the cured composite, and (9) the cured composite can be removed from the mold.

If desired, a post-curing operation can be carried out on the thus-produced composite part. A wide variety of post-curing methods are known (e.g., thermal curing as in an oven) and may be utilized.

It has been found that the position of the light relative to the composite part being fabricated can be varied as desired without significantly affecting the procedure. Accordingly, if desired, either multiple light sources can be used to accelerate the time required for the part to be satisfactorily cured, or light deflectors or other means can be used to allow the light to penetrate the mold from more than one direction.

Still further, and in accordance with one aspect of the present invention, because the positioning of the light source relative to the mold can be varied within wide limits, and the mold filling operation is decoupled from initiation of the reaction, it now becomes possible to effectively carry out a sequential fabrication. As one example, it is possible that, depending upon the configuration of a composite part, stresses and the like can be induced in the resulting part as a thermally cured part shrinks due to polymerization or due to cooling to ambient conditions.

Figure 1C:
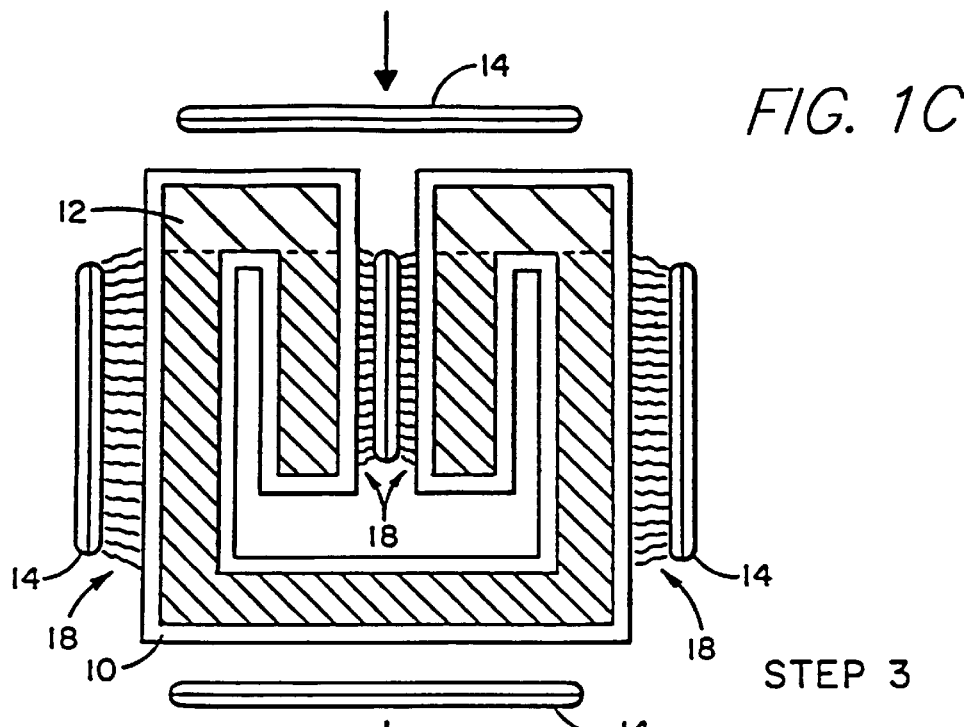
Figure 1D:
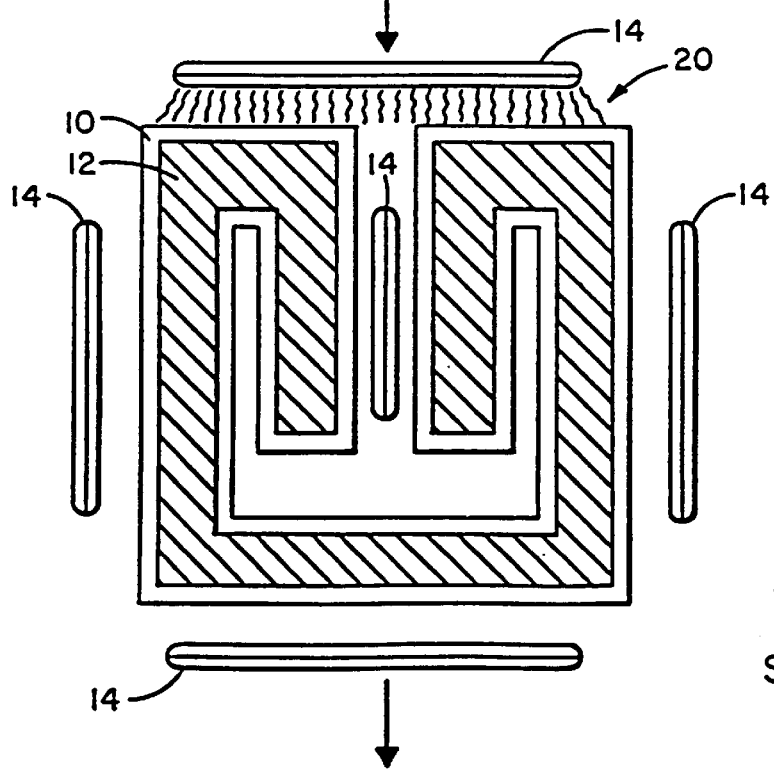
Figure 1E:
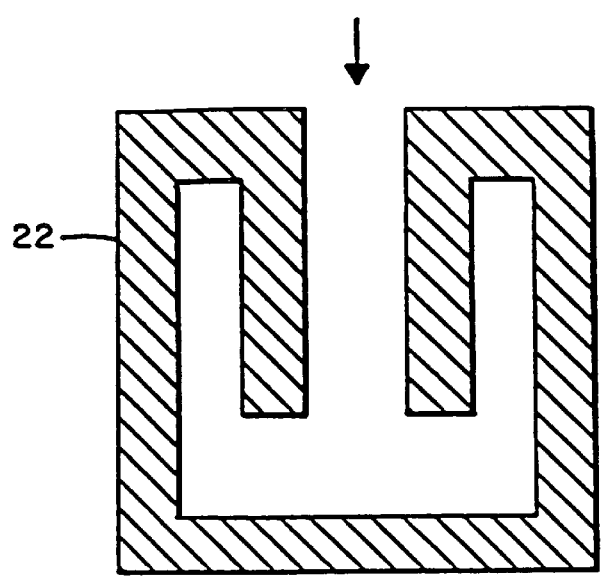

On the other hand, by utilizing the present invention, a sequential reaction can be initiated so that any stresses due to polymerization shrinkage and the like can be reduced or eliminated. This is further illustrated in FIG. 1 wherein the polymerization at different locations in the mold is initiated sequentially in a predetermined manner such that the unreacted resin near the polymerization front is allowed to flow, thereby relieving any stresses. More particularly, in Step 1 of FIG. 1A, transparent mold 10 is shown filled with an uncured photopolymerizable resin 12. Also, irradiating sources 14 are positioned about mold 10. In Step 2, the bottom 16 of the part being fabricated is first cured, and then the sides 18 (Step 3), FIG. 1C and the top 20 (Step 4), FIG. 1D of the part are cured. Step 5 (FIG. 1E) shows the demolded part 22. As may be appreciated, sequential reaction may be achieved by any of a number of illumination strategies which may involve relative motion between the light source and the mold, or sequential illumination of a number of strategically located light sources.

Indeed, when using the present invention with a light source operable in the ultraviolet wavelength range, there should generally be no requirement to utilize any shielding or the like of the mold or photopolymerizable composition from ambient light conditions. This is a further advantage derived from using the present invention which may be of significance in some situations. This advantage enhances the extreme versatility and relative ease with which the present invention can be utilized.

An additional class of optional additives which can be included in the photopolymerizable compositions of the present invention are thermal initiators, such as the peroxides (e.g., benzoyl peroxide), useful nitrites (e.g., azoisobutyronitrile), and other commercially available thermal initiators such as Wako VA-70 (2,2-azobis[2-(2-imidavolan-2-yl-)propane]dihydrochloride and VA-044 (2,2'-azobis(4-methoxy-2,4-dimethylvaleronitrile). There are several types of situations in which thermal initiators might be advantageously included. For example, where the composite part includes recessed portions that may not receive light directly or in situations where higher than ambient temperatures are utilized for lowering the viscosity of the particular monomer system or simply to reduce somewhat the curing time necessary, the use of thermal initiators may be helpful. The particular amount employed will typically be less than that used when the polymerization itself is achieved solely thermally. While the particular amount useful can be determined experimentally in a straightforward fashion, a useful level will typically be in the range of 0 to 5 weight percent based on the total weight of the photopolymerizable system. In addition, useful thermal initiators cannot absorb appreciably at the initiating wavelength for the photopolymerization.

As has been previously alluded to, there may be situations in which it is desired to carry out the polymerization at a temperature other than ambient conditions. A useful temperature range may vary from 20° C. up to 100° C. or perhaps higher.

Still further, while the present invention has been described with monomers which are polymerized via free radical polymerization, it should be appreciated that monomers can likewise be used which are polymerized cationically, if that is desired. Useful monomers which can be cationically polymerized include epoxides, vinyl ethers, styrenics, and propenyl ethers. When the photopolymerizable source utilizes monomers of this type, an illustrative coinitiator system that may be used for the photocure comprises an onium salt/anthracene system. A variety of onium salts are known to be useful as photoinitiators and may be employed herein. An illustrative example is UV9310 (GE Silicones, Pittsfield, Mass.). Similarly, many anthracene derivatives known as photosensitizers, but more appropriately termed a coinitiator herein, may be used. For example, 9-phenylanthracene may be employed. Also, suitable anthracene derivatives have been previously discussed herein. Effective amounts for the coinitiator systems may be determined experimentally in a straightforward fashion. A useful range may be from about 0 to perhaps 4 percent, based on the weight of the photopolymerizable system.

While not limited to this explanation, it is hypothesized that anthracene in a coinitiated cationic photopolymerization reaction will proceed as follows:

push the encapsulating material into the mold and the external heating of the dye used in current molding techniques, total costs are reduced for producing encapsulated microelectronic devices. An additional benefit is the flexibility in operational and product design.

For use in encapsulating microelectronic devices, the composites of the present invention contain a filler to improve flow and produce encapsulating materials with desirable properties. Preferably, the filler will be either powdered e-glass fiber or fused silica. More preferably, the filler will be fused silica. The concentration of reinforcing

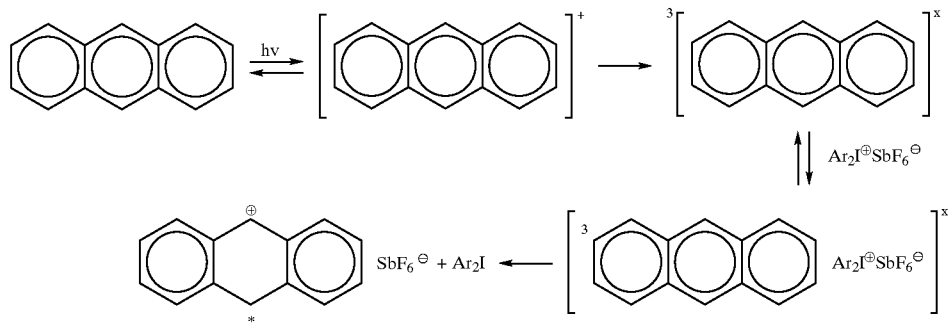

The result is that the absorbance decays over time as detailed in Example 15 which follows.

For most applications, as previously discussed, the thickness of the composite parts will fall in the range of about 0.1 centimeter up to two centimeters or somewhat more. The present invention is highly useful for forming polymeric or composite parts in this thickness range; and, indeed, while introducing some complications that may make it desirable to use multiple light sources and the like, as well as considerably longer reaction times, the present invention is likewise amenable to forming composite parts that are much thicker than the 1–2 centimeter range.

It should be appreciated that the present invention may be utilized to form any shape or part for any application. All that thus is intended by a "part" is a three-dimensional shape configured for the intended application. Examples of general applications have been previously listed by way of background.

Still further, while the present invention is highly advantageous for forming composite parts using RTM techniques, it should be appreciated that other types of molding techniques could be used. For example, rotational molding techniques have been employed for many applications; and the present invention can be used to form parts using these techniques.

Still further, the present invention offers substantial advantages for encapsulation of microelectronic devices such as, but not limited to, semiconductors and capacitors. Such microelectronic devices have a package thickness of about 0.1 to 0.3 cm. Photocured samples of the composite material of the present invention exhibit values for the coefficient of thermal expansion, degradation temperatures, flexural modulus, dielectric constant and chemical resistance comparable to current commercial encapsulants. The low viscosities of the composites of the present invention compared to current commercial encapsulants, allows for flow into the mold around the microelectronic device with minimum damage or wire sweep. This low viscosity also allows for flow during the subsequent photopolymerization cure, minimizing stresses to the microelectronic devices due to cure shrinkage. By eliminating the need for high pressure to materials can vary between 5 and 80 wt %, although the most preferred concentration is 50–80 wt % and more preferred is about 60–70 wt % reinforcing materials.

The two methods commonly used to encapsulate microelectronic devices are transfer molding and glob top encapsulation. In one embodiment of the present invention, a mold containing the microelectronic device to be encapsulated is filled completely with the photopolymerizable composite of the present invention at room temperature before polymerization is initiated. The low viscosity of the composite of the present invention will allow rapid mold filling at low pressures, and will minimize problems with the wire sweep. After the epoxy vinyl ester resins have filled the mold, polymerization is initiated by a combination of thermal and photochemical processes in which a photoinitiator produces active centers upon absorption of appropriate wavelengths of light, and a thermal initiator produces active centers of elevated temperatures. The resin and initiator are stable in the absence of light, but photopolymerize rapidly upon exposure to light of the appropriate wavelength. The photopolymerization is initiated by light entering the mold through appropriately placed windows transparent to the initiating wavelength and the heat released due to the exothermic reaction when photopolymerization occurs will trigger the thermal initiator. In this manner, the photopolymerizable compositions when present will polymerize rapidly to completion in a few minutes. Upon curing, these resins form crosslinked hydrophobic polymer networks exhibiting excellent mechanical, thermal, and chemical properties.

This photopolymerization process offers significant practical advantages over traditional transfer molding methods. The low operating pressures and essentially unlimited processing window are ideally suited to encourage the development of new products while reducing the cost of high density packages. In addition, the use of light rather than heat to initiate the polymerization allows precise control over when the reaction starts, and therefore completely decouples the mold filling and the cure. The low viscosity of the resin allows flow to take place during cure, and thereby minimizes stresses that arise due to cure shrinkage. Finally, since there is no need for high pressures or external heating of the die, the tooling costs associated with the process is very low, resulting in increased operational and product design flexibility.

In another embodiment, the photopolymerizable composition of the present invention can be used for encapsulating a microelectronic device by glob top encapsulation. The photopolymerizable composition is deposited over the microelectronic device and allowed to flow to cover the desired areas. The composition is then cured by exposure to light in the appropriate ultraviolet wavelength range in a manner similar to transfer molding techniques described herein. Examples of the use of glob top encapsulation in which the composition of the present invention can be applied can be found in U.S. Pat. Nos. 5,313,365, 5,557,142 and 5,696,033.

Yet still further, while the present invention offers substantial advantages for forming composites, it should be appreciated that advantages are likewise derived when forming either relatively thin parts or parts which do not require a reinforcement material phase. Indeed, the present invention may be used in any application where photopolymerization would be useful or where advantages are derived because the initiation of the polymerization reaction is decoupled from the filling of the mold or where use is desired due to any of the many other advantages that may be achieved by utilizing the present invention.

Thus, as one illustrative example of such a situation, many parts of relatively complex shapes are made in a sequential fashion. Potting compounds are often required to temporarily bond intermediate parts to one another or to secure these intermediates so that they can be shaped, molded, or allowed to cure in complex geometries. Potting compounds for this type of application must cure at relatively rapid rates once they have been applied, they must exhibit adequate mechanical properties and good adhesion to a number of substrates, and they must be of a putty-like consistency so that they do not flow before or during cure when applied to a part.

In addition to this application, potting compounds may also be used as permanent bonding agents or as a repair material in a variety of instances ranging from the transportation industry (automotive, marine, and aerospace) to home improvements (drywall repair). In accordance with one aspect of the present invention, a useful photopolymerizable potting compound can be made as follows: a viscosity enhancer or filler is added to a reactive resin (eq., a monomer or oligomer such as "DERAKANE" epoxy vinyl ester resin comprising, for example, about 99.8% of the resin by weight with the balance being a photoinitiator such as BEE) until it comprises 15–30% of the system by weight or higher depending on the application. The resulting compound can then be stored and used when necessary. An advantage of such a system is that any unused portion of the potting compound may be collected and stored for future use.

Suitable fillers that may be used include, but are not limited to, fumed silica, silica gels, Solka Flok, and low molecular-weight polystyrene. Additionally, a partially-cured, photopolymerizable resin may be used without filler, in which case the putty-like properties are achieved via the partial cure.

The following Examples are illustrative, but not in limitation of, the present invention. Unless otherwise indicated, the light source used was a 100-watt, long-range ultraviolet (UV) lamp as produced by UVP (San Gabriel, Calif.). In the Examples, the following were carried out as indicated:
Mechanical Properties Mechanical properties of various polymeric and composite specimens were measured using a United STM-20 instrument in a manner similar to the ASTM D 790 method. All mechanical properties were measured by the three point flexural strength test, using 50.8 mm (2 inch) long specimen samples with a length to thickness ratio of approximately 16. A 1000 lb. load cell was used with a downdrive rate of 0.05 inches/min. The flexural modulus was calculated for these samples at elongations between 0.05% to 0.25% of an inch.
Absorbance Spectraphotometric experiments were conducted using a Hewlett-Packard UV-Visible Spectrometer model 8452A. The absorbance of the various initiators and resins were obtained from dilute solutions of these compounds in 1-propanol. Absorbance decay experiments of 0.1 wt % BEE in 1-propanol were conducted as follows: the solution was irradiated with UV light for a predetermined time interval then removed from the light and placed in the spectrometer, where its absorbance was collected and recorded. This process was repeated until absorbance at 328 nm was insignificant.

EXAMPLE 1

This Example illustrates the self-eliminating absorbance characteristic of a photoinitiator used in the present invention.

BEE was added to 1-propanol in an amount such that the weight ratio of the BEE solute to the 1-propanol solvent was 0.1 to 99.9. Three grams of the thus-formed solution were placed in a 1 cm. H 1 cm. H3 cm. quartz cuvette, and the absorption of the solution was measured. The solution was exposed to a UV light source for a period of minutes, and the absorbance was measured as before.

Figure 2:
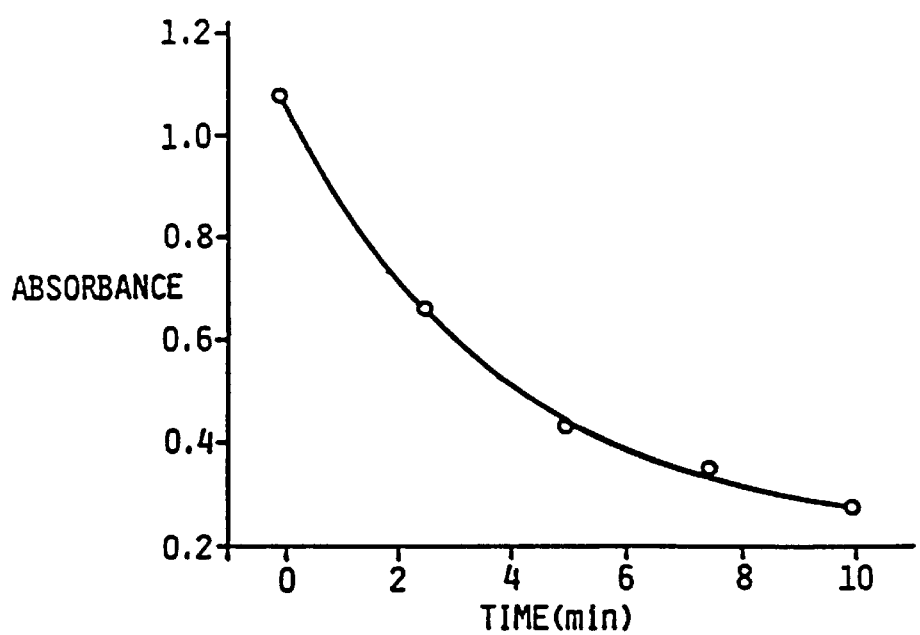
FIG. 2 is a plot of the light absorbance at 328 nm as a function of time for 0.1 wt. % benzoin ethyl ether in n-propanol illustrating the decay characteristic of a photoinitiator exhibiting self-eliminating absorbance.

The data obtained was plotted, and FIG. 2 shows the absorbance versus time. As can be seen, exposure to the UV light caused the absorbance of BEE to decay exponentially, with the time constant for this decay being 3.63741 minutes.

EXAMPLE 2

This Example compares certain physical properties of the photopolymerized parts made pursuant to this invention to such properties obtained when the same resin is thermally cured.

Two glass rods plugged at one end by rubber stoppers were filled with a reactive resin from a bulk mixture of 99.90 wt. % DERAKANE 411c-50 and 0.1 wt. % BEE (Samples 1 and 2). Photopolymerization was carried out in a time period of five minutes by projecting light from a 1000-watt Hg (Xe) UV light source onto the sample.

For purposes of comparison, two glass rods were filled with 99.90 wt. % DERAKANE 411c-50 and 0.1 wt. % 2,2'-azobisisobutyronitrile thermal initiator and then stoppered with rubber stoppers (Samples 3 and 4). Samples 3 and 4 were then thermally cured for 24 hours in an oven maintained at 70° C. Each of the four glass rods had an inside diameter of 0.22 inches.

Upon completion of the respective cure, each of the four samples were allowed to cool until they were cool enough to handle by hand. The cured resins were then removed from the glass rods by cracking the glass. The mechanical properties of the cured polymers were tested. The appearance, texture and strength of both thermally- and photo-cured polymers were similar. The flexural modulus of these samples are shown in Table 1 below:

TABLE 1

| Cure Method | Flex Modulus (kpsi) |
| --- | --- |
| Sample 1 - photocure | 461.61 |
| Sample 2 - photocure | 448.21 |
| Sample 3 - thermal | 429.83 |
| Sample 4 - thermal | 447.70 |

As can be seen, the photocured parts exhibit modulus properties similar to their thermally cured counterparts.

EXAMPLE 3

This Example illustrates the use of various reinforcement materials to make composite parts in accordance with this invention.

Similar to the procedure described in Example 2, glass rods were filled with 99.90 wt. % of a lower viscosity resin, i.e., DERAKANE 470-45 resin or DERAKANE 411c-50 and 0.1 wt. % BEE. Photocure was then effected using the light sources and procedure described in Example 3 although the curing times varied.

Table 2, below, sets forth the type of reinforcement material, the curing times and the modulus properties of the photocured parts:

TABLE 2

| Sample No. | Reinforcement Material | Wt. % of Reinforcement Material | Cure Time (Sec.) | Flex Modulus (GPa) |
| --- | --- | --- | --- | --- |
| 5 | Random Material | 30 | 300 | 15.2 |
| 6 | 1 mm glass beads | 60 | 318 | 3.0 |
| 7 | Short fibers | 45 | 420 | 9.7 |

As can be seen, various reinforcement materials can be utilized to provide satisfactory modulus characteristics of the resulting composite.

EXAMPLE 4

This Example illustrates the importance of photoinitiation versus thermal initiation for the types of reactive formulations disclosed herein.

Figure 3:
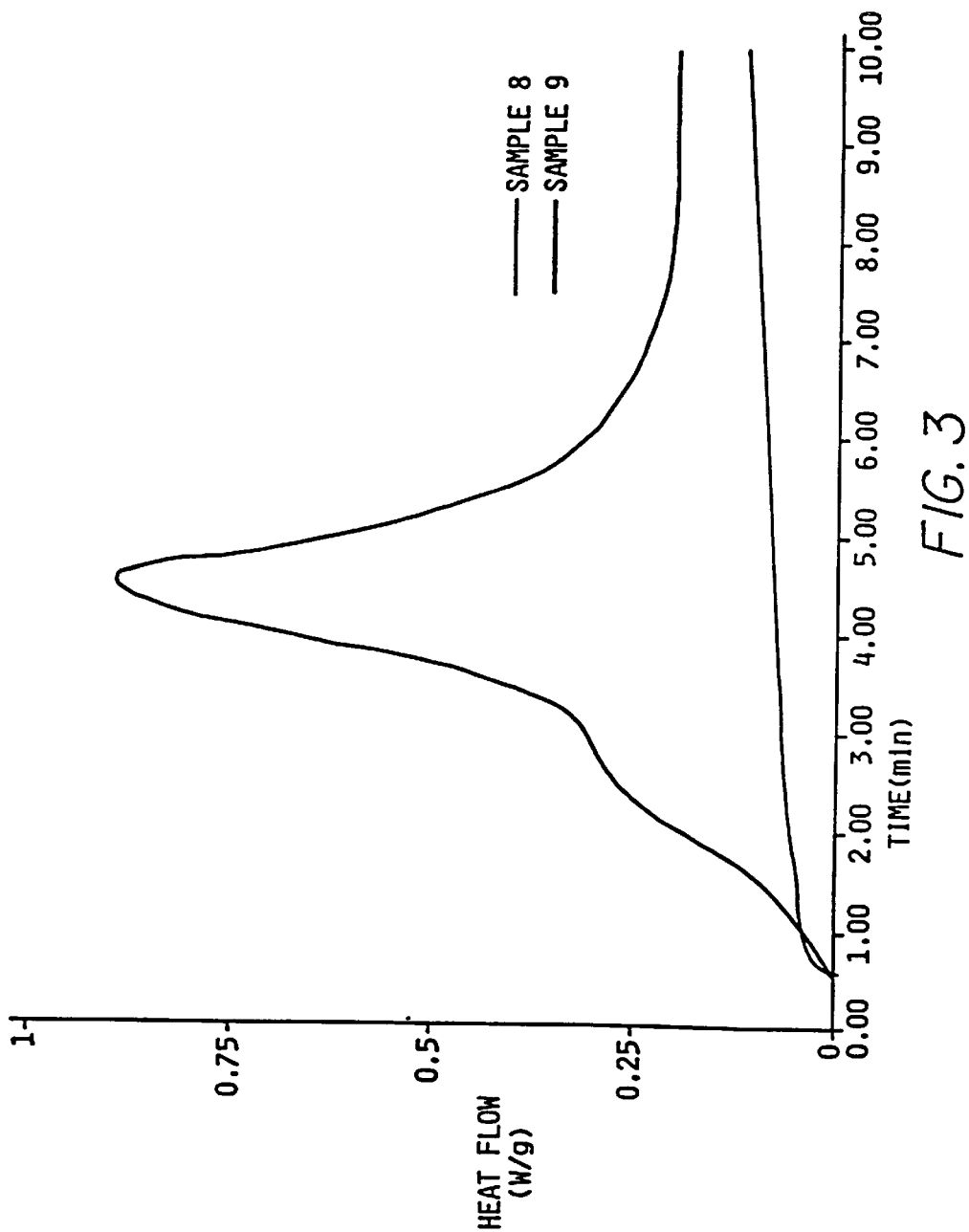
FIG. 3 is a graph of heat flow versus time during a photopolymerization reaction of DERAKANE 470-45 containing 0.2 weight % BEE photoinitiator, illustrating that the initiator is thermally stable and produces initiating species upon exposure to appropriate light.

Samples containing 99.8 wt. % DERAKANE 470-45 and 0.2 wt. % benzoin methyl ether (BME) were placed in a differential scanning calorimeter (PDSC) modified to allow the samples to be photoinitiated as well as thermally initiated. Sample 8 was placed in the PDSC and both the sample and reference pans were covered using two glass slides, each approximately 1 mm thick, to maintain the isothermal environment. The sample was preheated to 60° C. at a rate of 200° C/min, then maintained isothermally at 60° C. for 20 minutes. The heat flow versus time data was collected and recorded using a computer. Sample 9 was subjected to the same conditions except for the addition of a light source (intensity measured at 110 mW/cm$^2$ between 320 and 380 nm) throughout the isothermal heating period. FIG. 3 shows the resulting plot of heat flow versus time for the respective samples. The increases in heat flow correspond to the polymerization reaction.

As expected, Sample 9 polymerized within 5 minutes and formed a hard, clear polymer, while Sample 8 failed to polymerize over the length of the experiment (20 minutes) and remained a liquid. Similarly, samples containing these photoinitiators failed to polymerize when maintained at 60° C. for 24 hours in the absence of UV light.

This Example demonstrates that these initiators are thermally stable and produce initiating species upon exposure to appropriate light.

EXAMPLE 5

This Example shows the effect of preheating on the curing time.

A series of three samples, each weighing about 20 mg., were prepared from a bulk solution containing 99.90 wt. % DERAKANE 470-45 and 0.10 wt. % BEE. Each sample was placed in an aluminum pan and then placed in the sample chamber of a Perkin Elmer Differential Scanning Calorimeter (DSC) (DSC 7). Both the sample and reference chambers were covered with a rectangular glass slide (about 1 mm. thick) to allow light from a 200-watt Hg (Xe) arc lamp to be projected down 6 cm. onto each sample.

The samples were preheated as follows: Sample 10, 70° C.; Sample 11, 90° C.; and Sample 12, 110° C. The plots of heat flow versus time are shown in FIG. 4.

Figure 4:
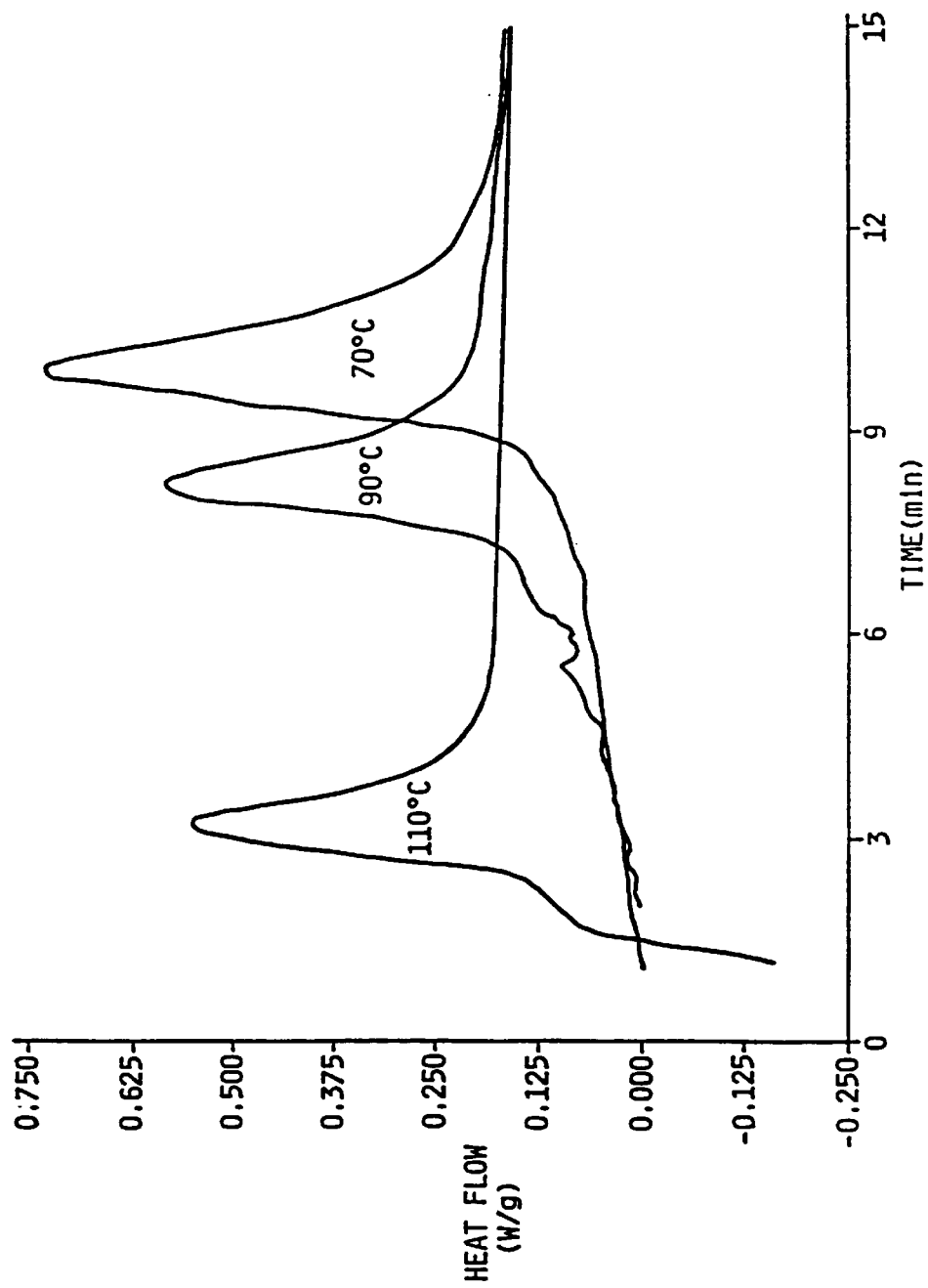
FIG. 4 is a graph of heat flow versus time during photopolymerization reactions of DERAKANE 470-45 containing 0.1 wt % BEE photoinitiator, which illustrates the effect of temperature on the cure time for samples reacted under isothermal conditions.

As shown in FIG. 4, curing may be accelerated by preheating the photoreactive resin.

EXAMPLE 6

This Example illustrates the use of the present invention to make a composite part using rotational molding.

A solution containing 99.90 wt. % DERAKANE 470-45 and 0.10 wt. % BEE was mixed in a glass test tube (1.78 cm. outside diameter) with e-glass fibers chopped into a fine powder, the fibers comprising 58.8 wt. % of a 14.1 gm. sample (Sample 13). The test tube was placed on an automatic mixer to create a resin slurry, and the test tube was then clamped to a spindle attached to a ½ horsepower motor.

The middle of the test tube was placed in the center of a three-pronged clamp in order to maintain a relatively uniform axis for rotation. The bottom of the test tube, containing Sample 13, was placed in the path of the 1000-watt light source described previously; and the test tube was rotated at a relatively moderate rate (estimated to be between about 100–200 rpm) for 4 minutes.

This Example is considered to demonstrate that the present invention can be used in rotational molding techniques.

EXAMPLE 7

This Example illustrates that the present invention can be utilized to make different geometric shapes.

Three samples (Samples 14–16) were made using the procedure and apparatus described in Example 6. The cure times used and the weight percent were varied as set forth in Table 3:

TABLE 3

| Sample No. | Cure Time (min.) | Fiber (wt. %) | Shape of Composite |
| --- | --- | --- | --- |
| 14 | 3.25 | 44 | pipe[1] |
| 15 | 3.25 | 33 | interior threaded cylinder[2] |
| 16 | 3.75 | 44 | exterior threaded cylinder[3] |

[1]The pipe had inside and outside diameters of about ⁵⁄₁₆" and ⅝", and the hollow structure was obtained by photopolymerizing the mixture between two concentric glass tubes.
[2]The interior threads were obtained by polymerizing the resin around a screw (8 diameter x 12") placed in the center of the mold.
[3]The exterior threads were made by photopolymerizing the slurry between two concentric glass cylinders. The inner cylinder was smooth and the outer cylinder had screw threads on its interior surface. The resulting part had an ID of 1@ and an OD of 1³⁄₁₆@.

The resulting composites demonstrate that the present invention can be utilized to make composites of varying shapes.

EXAMPLE 8

This Example illustrates the effects of cure time and degree of reinforcement material loading on the modulus of the resulting composites.

Individual samples were prepared from a bulk solution containing 0.06 wt. % BEE, 0.06 wt. % benzoin methyl ether (BME), and 99.88 wt. % DERAKANE 470-45 reactive resin. Four-inch glass tubes with an inside diameter of 0.25 inch were coated with a mold release agent (Carnuba Wax), filled with a slurry containing the reactive resin, BEE and BME, and e-glass fibers chopped into a fine powder and then stoppered at one end. The samples were then placed vertically in the path of light from a 1000-watt Hg (Xe) arc lamp at a distance of six inches and photocured for a measured length of time.

The exposure time to the light source was varied from three to ten minutes while the degree of reinforcement material loading was varied from 0 to 25 and 50 wt. %. Table 4 sets forth the results:

TABLE 4

| Sample No. | Exposure Time (min) | Wt. % Reinforcement Material | Flex Modulus (kpsi) |
|---|---|---|---|
| 17 | 3 | 0 | 434 |
| 18 | 3 | 25 | 759 |
| 19 | 3 | 50 | 1096 |
| 20 | 5 | 0 | 522 |
| 21 | 5 | 25 | 840 |
| 22 | 5 | 50 | 1397 |
| 23 | 7 | 0 | 540 |
| 24 | 7 | 25 | 901 |
| 25 | 7 | 50 | 1554 |
| 26 | 10 | 0 | 503 |
| 27 | 10 | 25 | 914 |
| 28 | 10 | 50 | 1388 |

As can be seen in Table 4, the modulus increased generally proportional to he degree of reinforcement material loading. Additionally, some improvement in modulus resulted with increasing cure time up to a point. More particularly, it appears that the cure time can reach a point where the modulus is no longer enhanced and may even be diminished.

EXAMPLE 9

This Example demonstrates the effect of initiator concentration on the modulus of the photocured polymers.

The procedure employed in Example 8 was used, except that BEE was the only photoinitiator, the remainder being the DERAKANE 470-45 reactive resin, and the cure time used was five minutes. Also, no reinforcement material was included.

Figure 5:
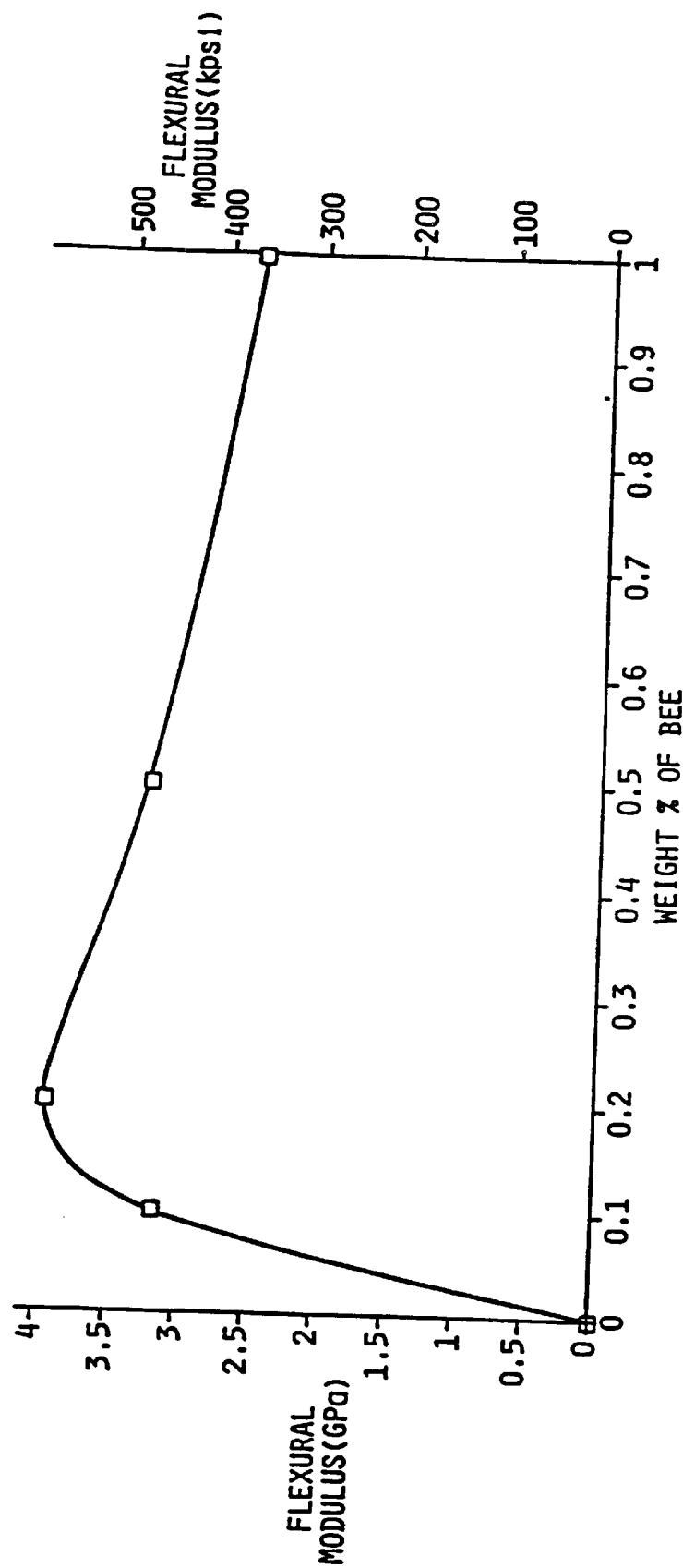
FIG. 5 is a graph showing the effect of initiator (BEE) concentration on the flexural modulus of polymers obtained by photocuring DERAKANE 470-45 for five minutes with an initiating light intensity of between 120 and 140 mW/cm$^2$ between 320 and 380 nm.

Table 5 sets forth the results which are likewise plotted in FIG. 5:

TABLE 5

| Sample No. | Wt. % Initiator | Flex Modulus (kpsi) |
|---|---|---|
| 29 | 0.1 | 459 |
| 30 | 0.2 | 568 |
| 31 | 0.5 | 473 |
| 32 | 1.0 | 367 |
| 33 | 2.0 | — |
| 34 | 4.0 | — |

The results indicate that an increased level of photoinitiator can increase the modulus up to a point, perhaps the level needed to insure a complete propagation of the photopolymerization. Thereafter, the modulus can decrease with increasing photoinitiator concentration which may be the result of a decrease in the self-elimination of the absorbance of the photoinitiator, the resulting decrease in the molecular weight of the polymer, or both. For example, Sample 33 and Sample 34 did not completely polymerize under the conditions set forth in this Example, and therefore the flexural modulus for these samples could not be obtained.

EXAMPLE 10

This Example illustrates the effects of photoinitiator concentration on the thickness of a solid part that can be obtained with a fixed cure time.

Individual samples were prepared from DERAKANE 470-45 resin and varying concentrations of BEE photoinitiator (the amount of photoinitiator, by weight, was varied from 0.05% to 2.0%). Each sample was placed in a test tube having about a 15 mm inside diameter. The outside of the test tube was opaque, therefore cure was affected from only the top of the sample being exposed to the 1000 watt arc lamp previously described.

Figure 6:
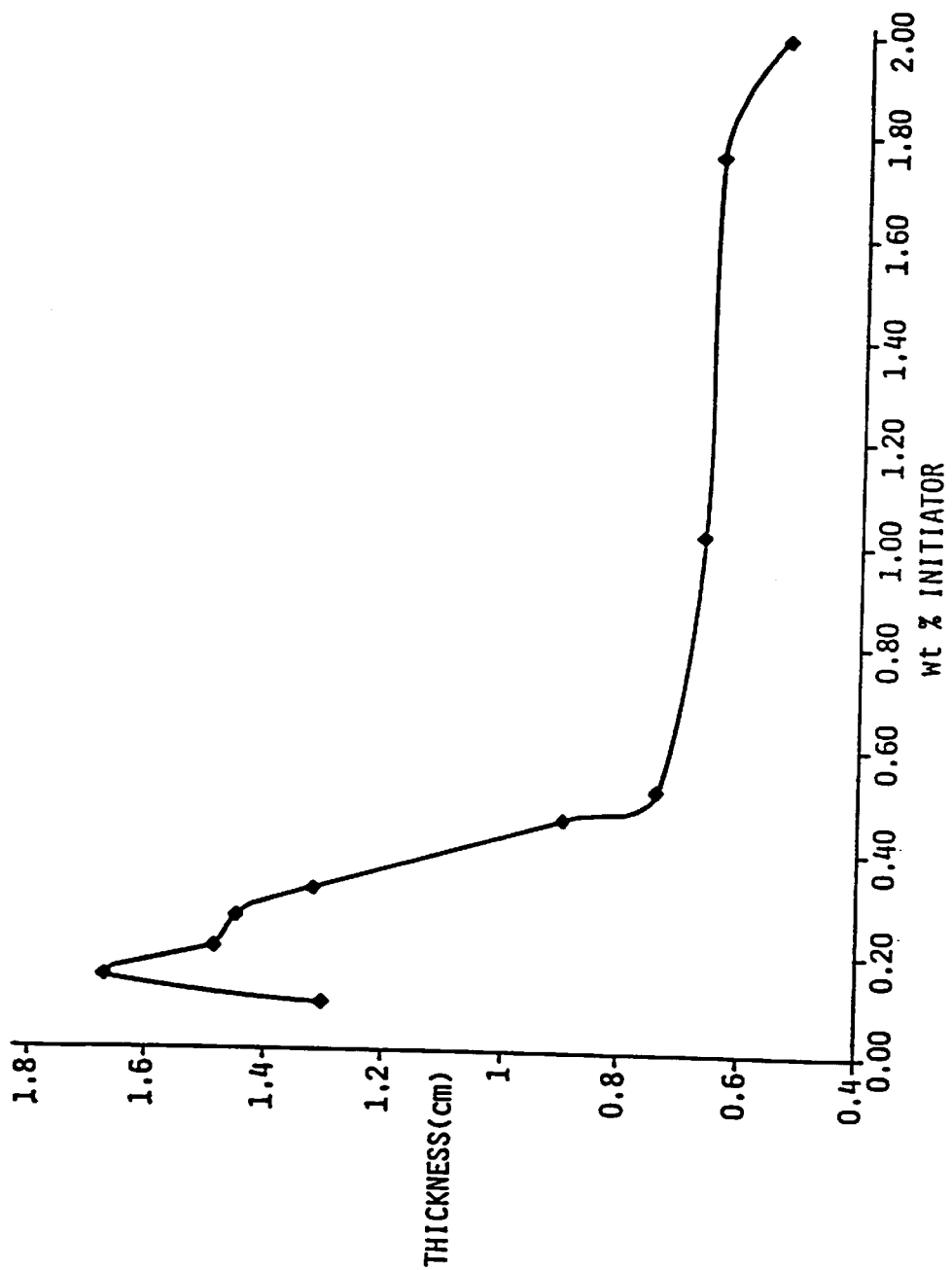
FIG. 6 is a graph of polymer thickness versus initiator concentration for DERAKANE 470-45 samples cured for 4 minutes at an initiating light intensity of 115 mW/cm$^2$ between 320 and 380 nm.

Each sample was cured for four minutes, and the thickness in centimeters (measured from the top of the sample) of the solid, cured part was measured using calipers to determine the relative effectiveness of the cure. The thickness of the solid, cured part versus photoinitiator concentration was graphed, and the results are shown in FIG. 6.

As can be seen, the thickness of the solid part that can be obtained using the subject process parameters first increases at relatively low photoinitiator concentrations (i.e., 0.05 to 0.2 wt. %), and then decreases as the photoinitiator concentration is further increased.

EXAMPLE 11

This Example illustrates the effect of varying the intensity of the ultraviolet light source upon the thickness of the solid, cured part that could be obtained using two different photoinitiators.

Two series of samples were prepared, each containing DERAKANE 470-45 and 2.0% by weight of two different photoinitiators. One series included BEE, and the other used IRGACURE 651 photoinitiator ($\alpha,\alpha$-dimethoxy-$\alpha$-phenylacetophenone from Ciba-Geigy, Hawthorne, N.Y.). The 1000-watt UV lamp previously described was used to cure each sample which had been placed in a test tube (a cylindrical glass vial, 1 cm ID). A cure time of four minutes was used, and the intensity was adjusted over the range indicated in FIG. 7.

Figure 7:
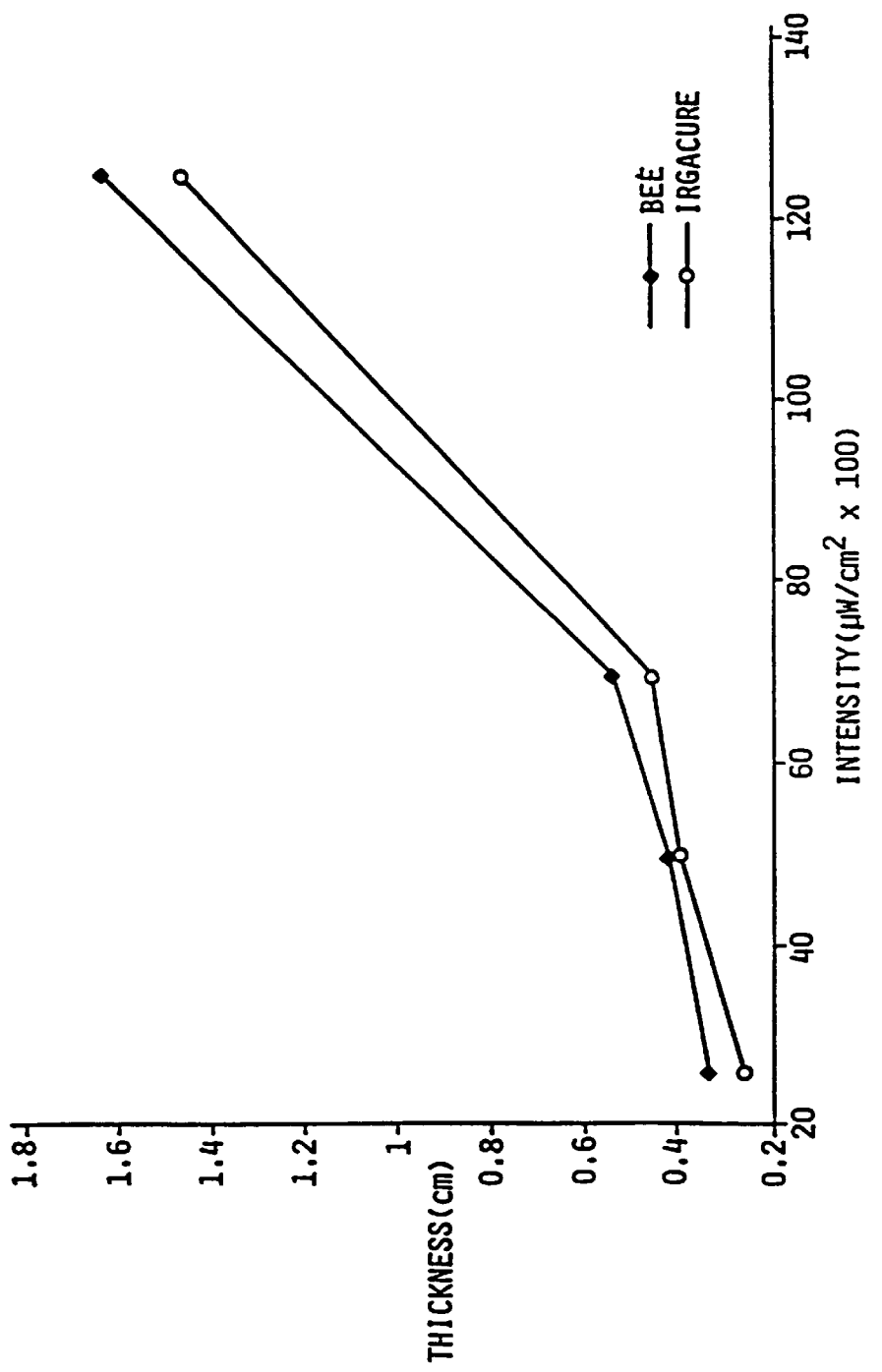
FIG. 7 is a plot of polymerization thickness versus initiating light intensity for 0.1 wt. % initiator which illustrates the relationship between the initiating light intensity and the thickness of the resultant polymer for two different photoinitiators which self-eliminate.

The thickness of the solid, cured part in each sample was measured as described in Example 10. The results are shown in FIG. 7.

These results illustrate that, within limits, the thickness of the part being formed can be increased as the intensity of the light source is increased.

EXAMPLE 12

This Example illustrates the effect on the modulus of the cured composite for varying levels of reinforcement materials as the cure time is varied.

Various samples were made using 99.88% DERAKANE 470-45 and 0.06% BEE and 0.06% BME with a reinforcement material (i.e., finely chopped e-glass fibers) at levels of 0, 25, 50 and 60%.

The samples made were 8 mm (¼ inch) thick, and a light intensity of 480 mW/cm$^2$ between 320 and 380 nm was used. A slurry consisting of the desired fiber loading, resin and initiator was poured into a mold coated with a release agent (silicone spray) and exposed to the initiating light for a predetermined period of time. Subsequently, the sample was then removed from the light and allowed to cool to room temperature by natural convection. The sample was then removed from the mold, and its flexural properties were tested.

Figure 8:
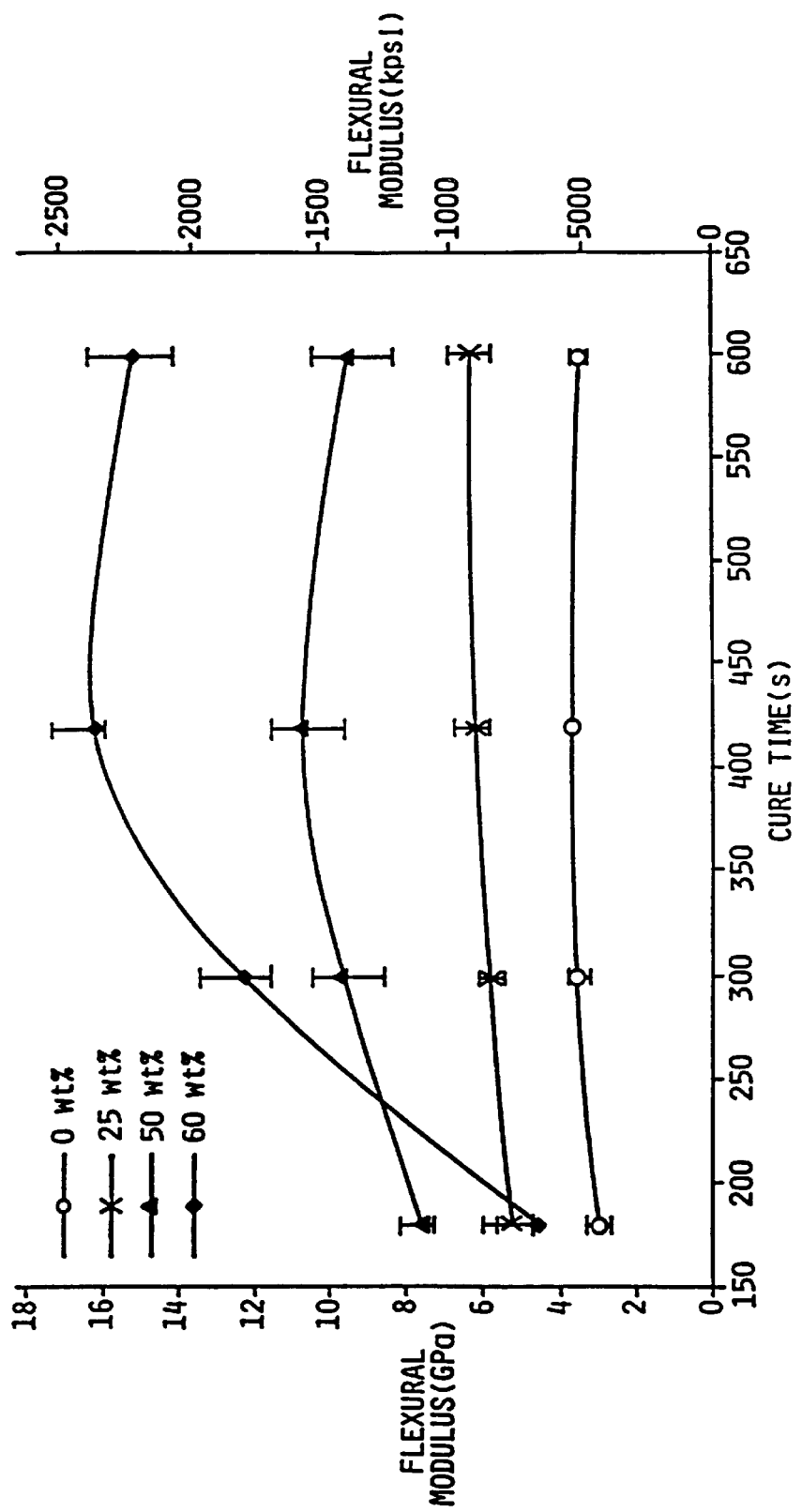
FIG. 8 is a graph of flexural modulus versus cure time for photocured DERAKANE 470-45/glass fiber composites which shows the effects of cure time and degree of fiber loading on the flexural modulus of the resulting composites.
Figure 9:
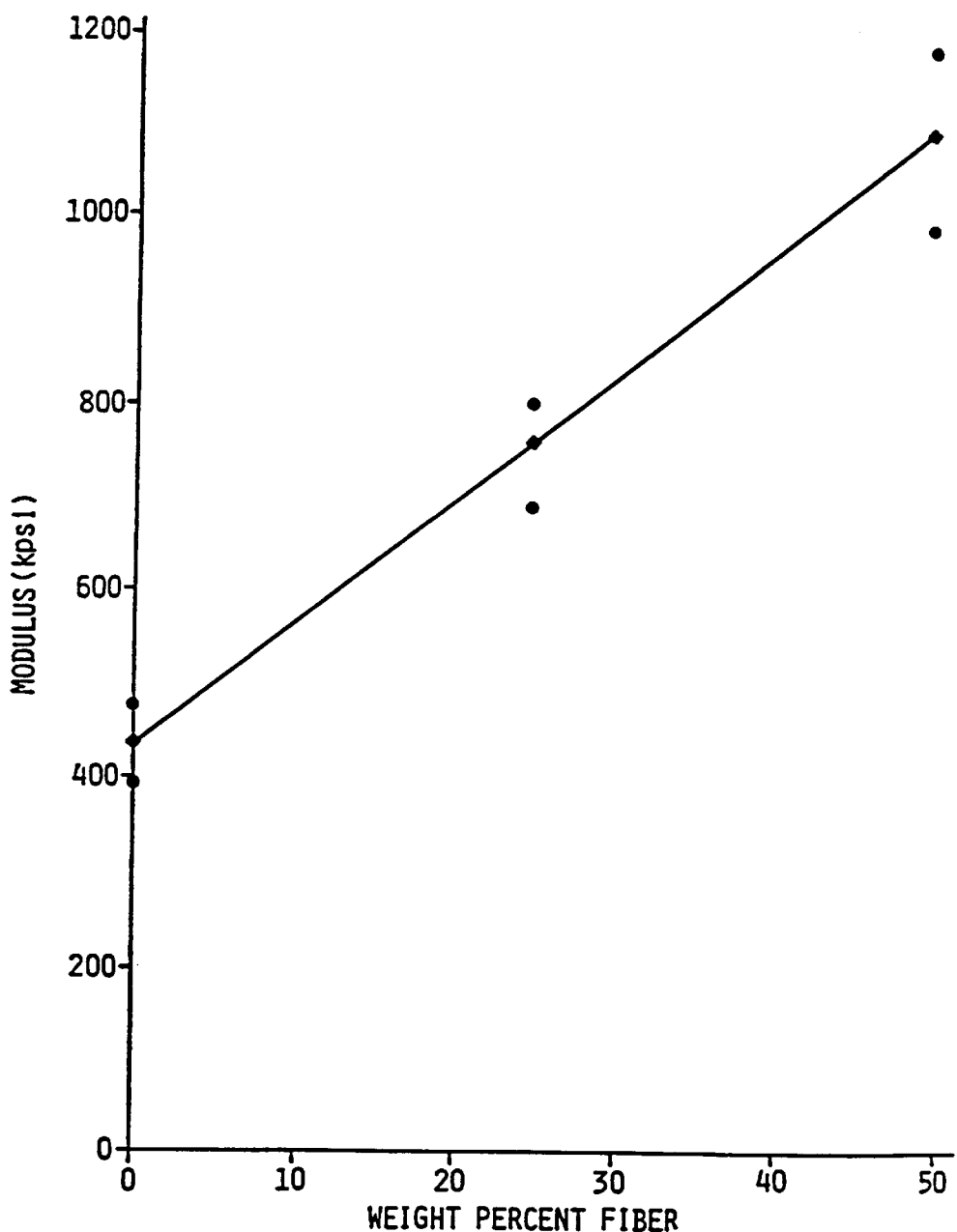
FIGS. 9–12 are graphs of flexural modulus versus degree of fiber loading for DERAKANE 470-45/glass fiber composites that have been photocured for three, five, seven and ten minutes, respectively, which illustrate the variance in the flexural modulus as the fiber loading and the cure time are varied.
Figure 10:
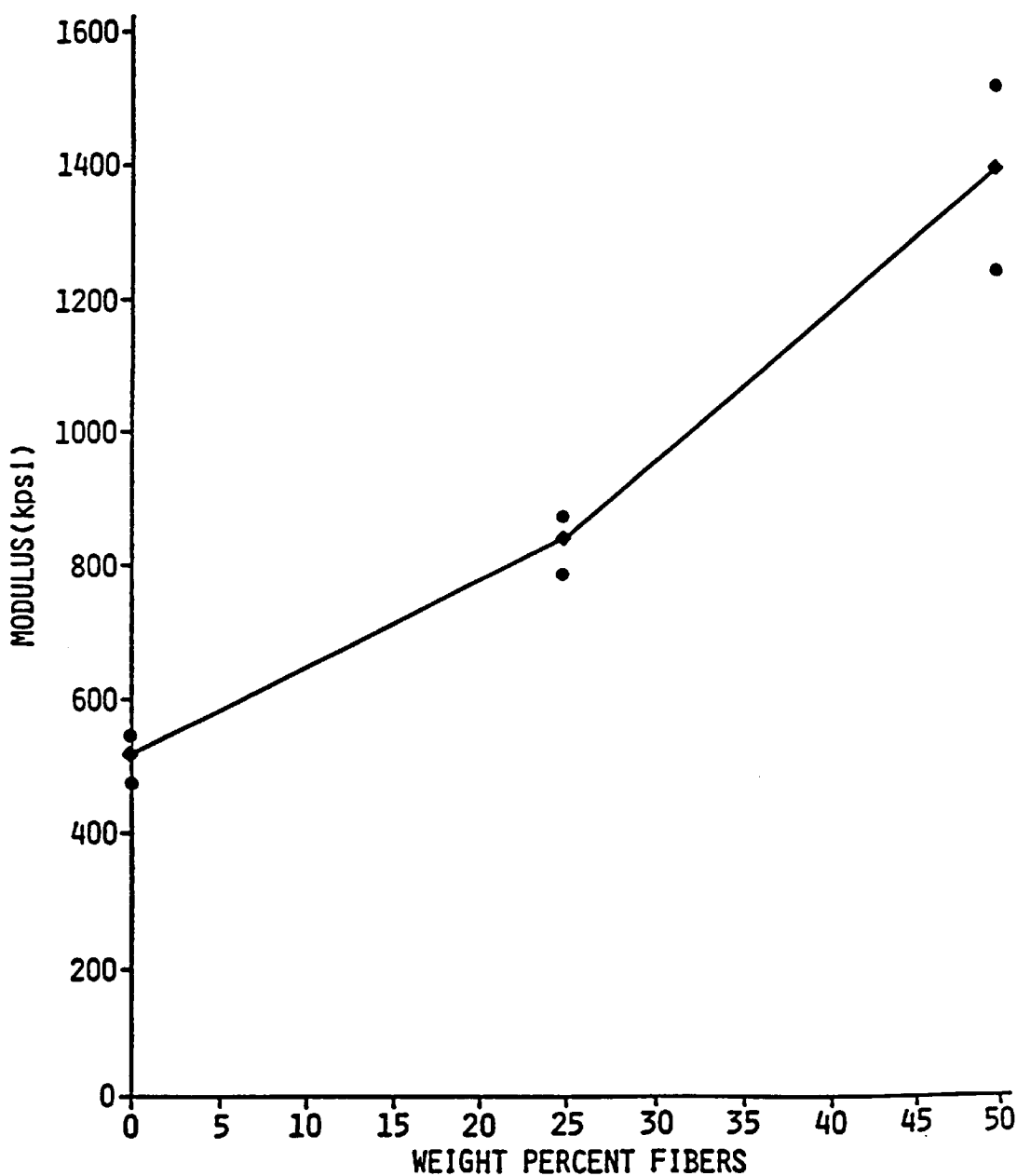
Figure 11:
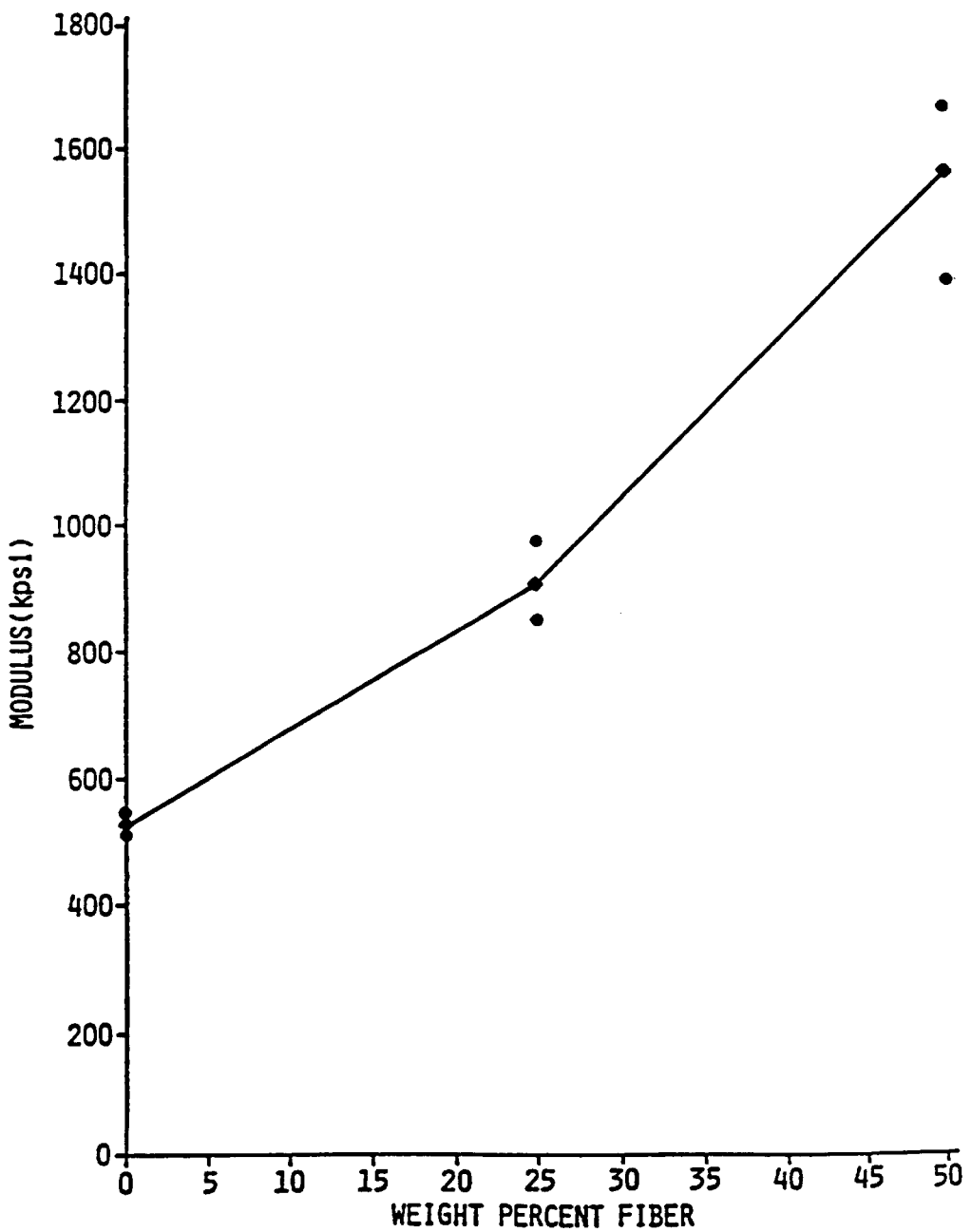
Figure 12:
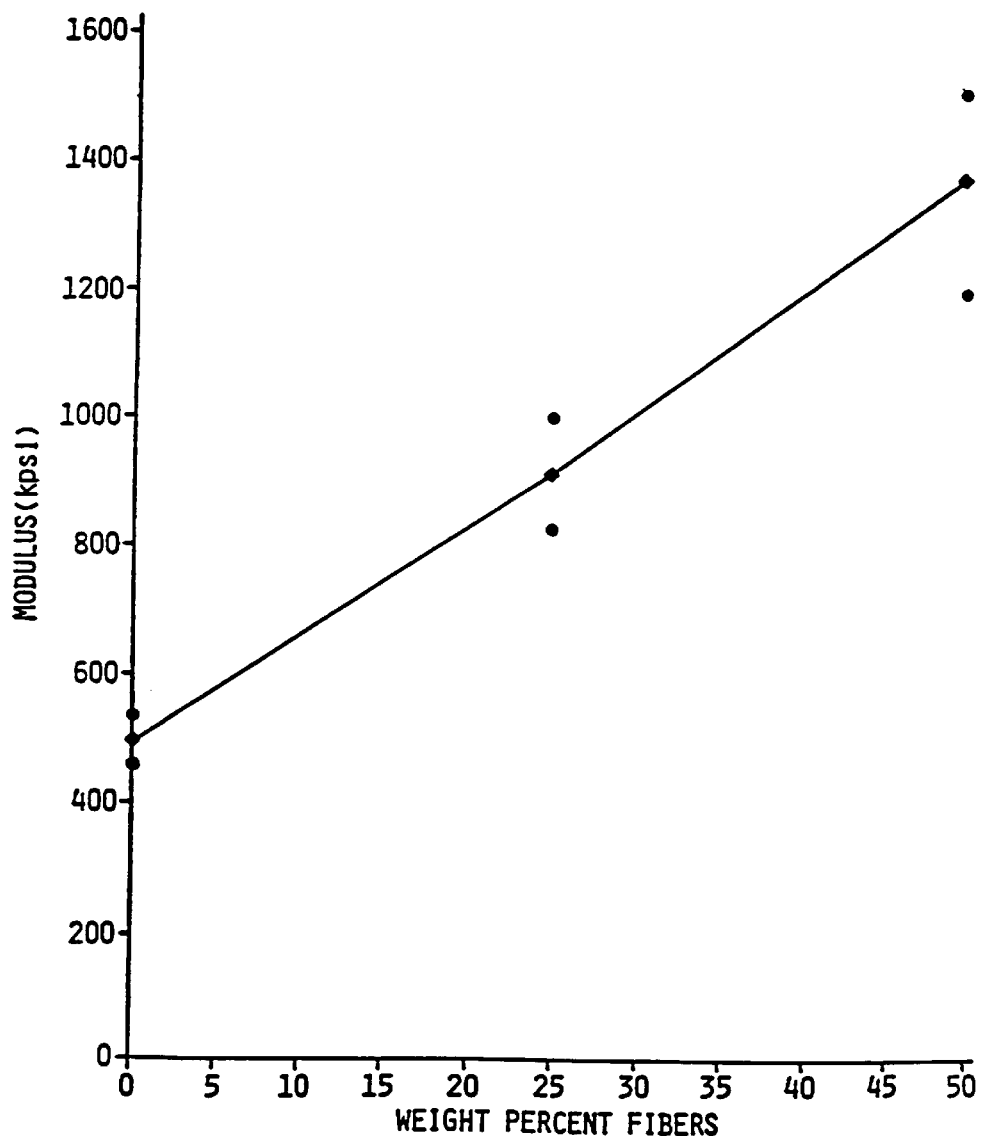

These results are shown in FIG. 8 (each point on the graph represents an average of at least 4 independent measurements, with the high and low values being depicted by error bars). The results shown in FIG. 8 indicate that after 420 seconds (7 minutes) of cure there is no further increase in the modulus of the material. It may also be noted that there is a slight decrease in flexural modulus at higher exposure times, although this decrease falls close to the limits of experimental error. Also, it is possible that the polymer is degraded under the UV light.

As expected, increasing the amount of fiber increases the flexural modulus of the samples. It can be seen that the flexural modulus increases by a factor of 3 at 50 wt % fiber loading.

EXAMPLE 13

This Example shows the dependence of the flexural modulus of a solid composite upon the level of reinforcement material included for various cure times.

The procedure employed and the equipment utilized were essentially the same as described in Example 12. 99.88% DERAKANE 470-45 and 0.06% BEE and 0.06% BME were placed in test tubes while the reinforcement material (the fibers of Example 12) level was at 0, 25 or 50%. Four sets of samples were prepared and cure times of 3, 5, 7, and 10 minutes were each used for each set of samples.

FIGS. 9–12 show, at the cure time used, how the modulus was effected as the fiber level increased. As seen in each figure, the modulus of the cured, solid part increased as the fiber level increased.

EXAMPLE 14

This Example illustrates the effects of initiating light intensity and cure time on the flexural modulus of photo-cured composites.

Figure 13:
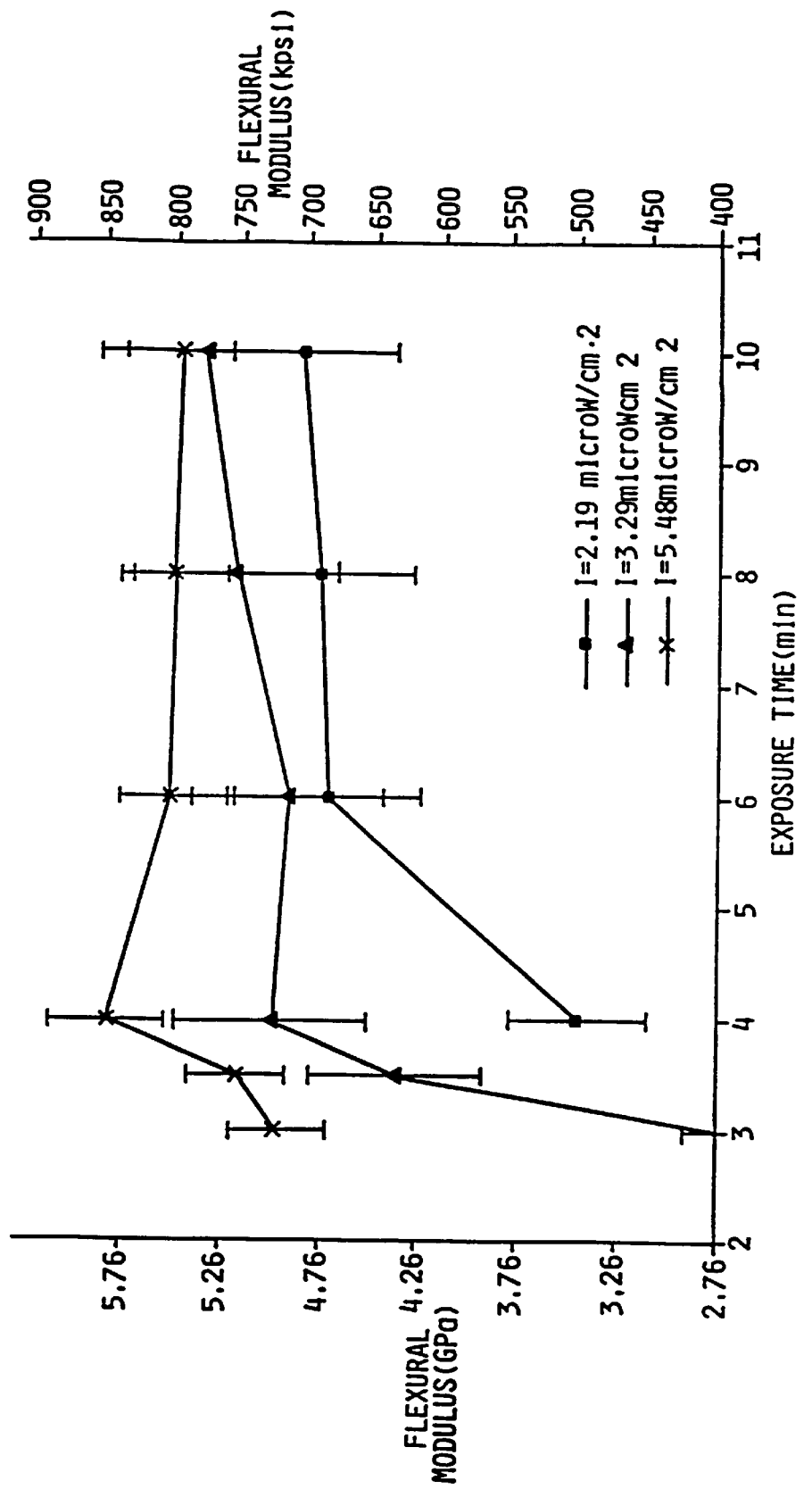
FIG. 13 is a graph of flexural modulus versus cure (exposure) time for photocured DERAKANE 470-45 containing 0.08 weight % of BEE, and also of BME, and 25 weight % powdered fiber, illustrating the variance in flexural modulus as the cure time and light intensity are varied.

Samples containing DERAKANE 470-45, 0.08 weight % BEE and 0.08 wt % BME and 25 weight % powdered fiber were polymerized under UV light at various light intensities, for different periods of time as shown in FIG. 13. The initiating light (from the 1000 watt lamp) was varied between 240, 360 and 600 mW/cm$^2$ between 320 and 380 nm. As previously observed, increasing the time of cure increased the mechanical strength of the composite. It was also observed that increasing the intensity of the initiating light within the indicated range not only reduced the cure time, but also resulted in an increased flexural modulus of the final composite.

This Example demonstrates that increasing the intensity of initiating light results in shorter cure times as well as improved mechanical properties.

EXAMPLE 15

This Example illustrates the self-eliminating absorbance characteristic of a coinitiator system useful for cationically photopolymerizing appropriate monomer systems.

Anthracene dissolved in 1-propanol ($1\times10^{-2}$ wt. %) and UV9310 onium salt photoinitiator (GE Silicones, Waterford, N.Y.) comprised the coinitiator system. The resulting mixture (97.98 wt. % 1-propanol, 2 wt. % UV9310 and $1\times10^{-2}$ wt. % anthracene) were placed in a quartz cuvette, and the absorbance was measured. The solution was then exposed to a 100 watt Long Range UV Lamp intensity (approximately 330–550 mW/cm$^2$ between 320 and 380 nm) for a period of minutes, and the absorbance over that period was measured. The monitored wavelength was 364 nm.

Figure 14:
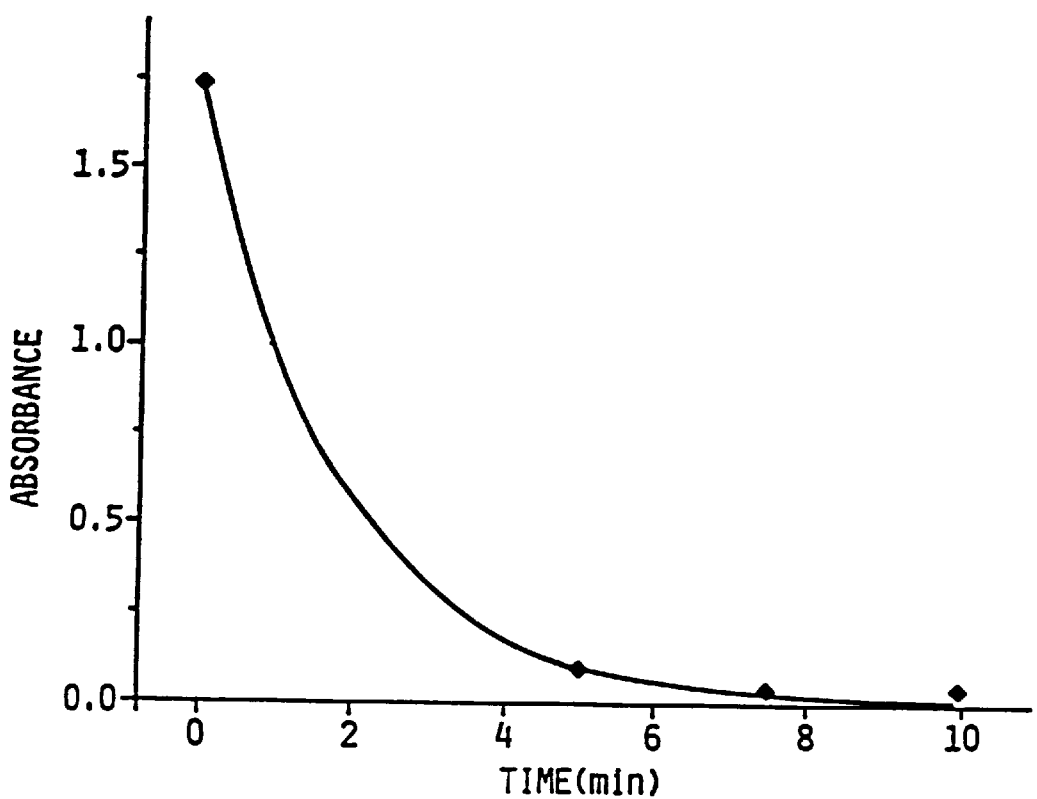
FIG. 14 illustrates the decay in absorbance of initiating light at 364 nm as a function of time for an anthracene/diaryliodonium coinitiator system which may be used to cationically photopolymerize an appropriate monomer system.

The data obtained is plotted in FIG. 14. As can be seen, exposure to the UV light caused the absorbance of the coinitiator system to decay exponentially.

This Example demonstrates a coinitiator system with self-eliminating characteristics which may be used in conjunction with epoxies, styrenics, vinyl ethers and other cationically polymerizable monomers/resins to produce thick and/or composite parts.

EXAMPLE 16

This example shows the effect of filler loading on the cure rate of the photopolymerizable compositions of the present invention. Short cure times are desirable in order to meet the high speed requirements of mass production. Current encapsulant systems for traditional transfer molding processes cure in one to three minutes at a temperature of 175° C., and require a post cure of 4 to 8 hours at this elevated temperature. Manzione, L. T., *Plastic Packaging of Microelectronic Devices*, Van Nostrand Reinhold, New York, N.Y. (1990). In addition, a typical package is one to three millimeters thick. In the photopolymerization system of the present invention, the cure is performed with no external heating, and the cure time decreases markedly (the cure rate increases) as the sample thickness is reduced. Therefore, a cure time of a few minutes for a 6.5 mm thick sample would easily meet the cure rate requirements for semiconductor encapsulants which are typically 1 to 3 mm thick.

A full complement of epoxy vinyl ester resins, DERAKANE resins 411, 441, 470, 510 and 8084 were filled with powdered e-glass fibers. These samples were cured in polyethylene vials illuminated from above using near-UV light (200 mW/cm$^2$) from a 1000 W mercury arc lamp (Oriel Corporation, model 6293). The lamp was equipped with a water filter to eliminate the incident infrared light. For each resin, the time required for complete cure for 6.5 mm thick samples was determined as a function of filler loading and initiator formulation. Some samples were polymerized using only BEE as the photoinitiator, while other dual-cure samples contained both BEE and BP. Both BEE and BP were present at about 0.2 wt %.

Figure 15:
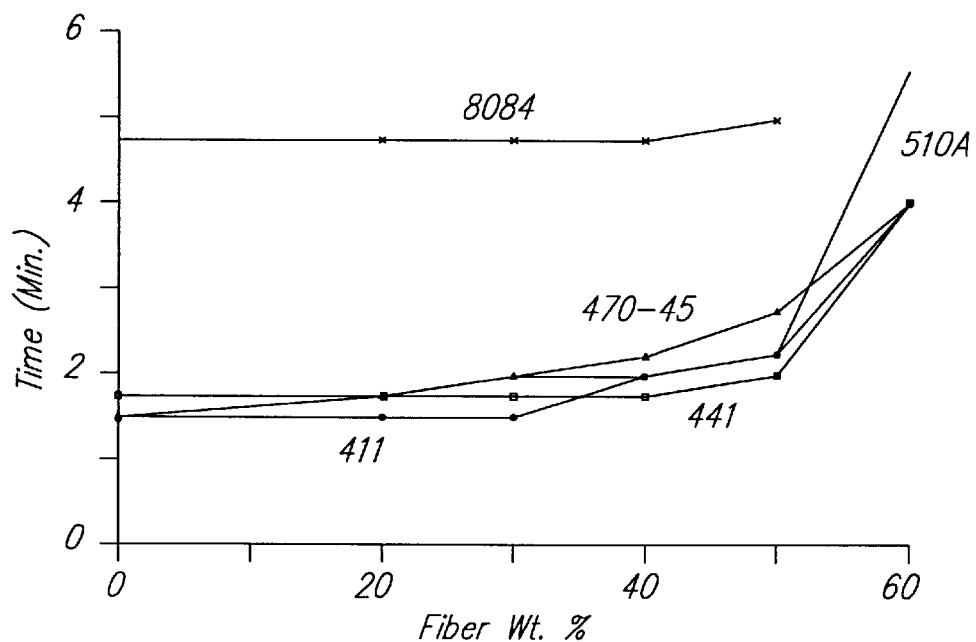
FIG. 15 is a graph showing the effect of the amount of filler on the cure times of photopolymerized samples based on various DERAKANE resins.

Representative results for a light intensity of 200 mW/cm$_2$ are shown in FIG. 15, which contains profiles of the time required for complete cure as a function of filler loading for the series of DERAKANE resins. As FIG. 15 illustrates, the required cure time is remarkably independent of the filler loading up to 40 or 50 wt % filler. In addition, with the exception of the high viscosity 8084 resin, all formulations were completely cured in 1 to 3 minutes for filler loadings up to 50 wt %. Formulations containing both photo and thermal initiators revealed that the dual-cure scheme shortened the time required for complete cure.

EXAMPLE 17

This example illustrates the effects of filler loading on the flexural modulus of the resulting composites. Encapsulants must have excellent mechanical properties in order to withstand mechanical shock, vibration, and handling during assembly. One of the more important mechanical properties is the flexural modulus, which characterizes the stiffness of the material under an applied load.

Specimens for mechanical testing were prepared by carrying out the photopolymerizations in cylindrical glass molds irradiated radially. The powdered e-glass fiber was mixed with the formulated resin to form a slurry with a desired filler loading. This slurry was poured into the mold and irradiated with unfiltered UV light from the 1000 watt Hg(Xe) arc lamp using 0.1 wt % BEE as the photoinitiator. The fully-cured cylindrical specimens were 8 cm long and 5.8 mm in diameter.

The mechanical properties of photocured samples were determined using a United STM-20 instrument in accordance with the ASTM D 790 method. The flexural modulus was measured using the three point flexural test with a span length of 5.08 cm (2 inches), a 454 kg (1000 pound) load cell, and a downdrive rate of 0.0212 mm/sec (0.05 inches per minute). The flexural modulus was calculated for these samples at elongations between 0.0013% to 0.0064% of a meter. Average values of measurements from at least four different samples were used for each specimen.

Figure 16:
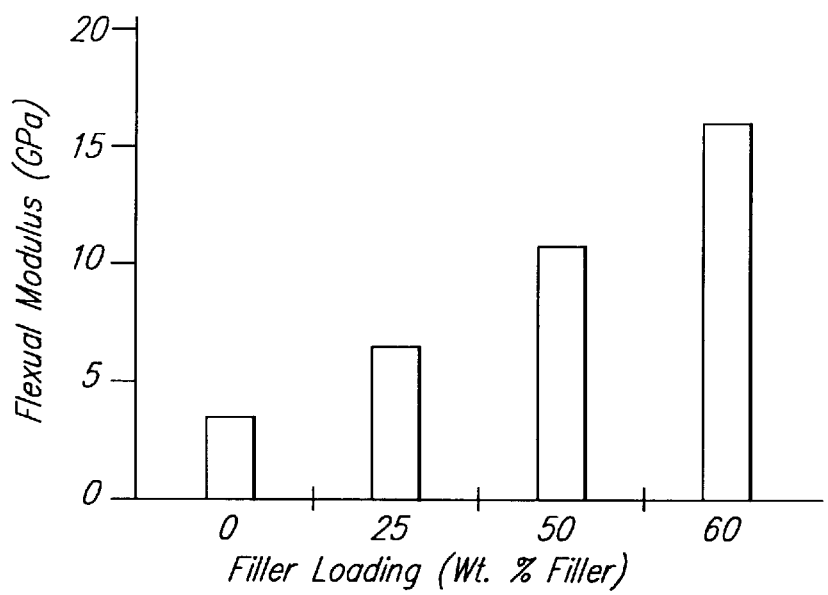
FIG. 16 is a graph showing the effect of the amount of filler on the flexural modulus of photopolymerized samples based on DERAKANE 470-45.

Experimental results for the effect of filler loading on the flexural modulus of the photocured encapsulants are shown in FIG. 16. The flexural modulus was found to increase with filler content, achieving a value of more than 16 GPa for a 60 wt % loading. For filler loadings above 50 wt %, the flexural modulus of the photopolymerized samples exceeds the specifications for microelectronic encapsulants. Kinjo, N. et al., *Advances In Polymer Science* 88:5 (1989).

EXAMPLE 18

This example demonstrates the chemical resistance properties of the photopolymerizable composites of the present invention. The chemical resistance of the fully cured encapsulant is important because solvent uptake can lead to corrosion and, hence, failure of the microelectronic device. The solvent resistance of the photocured encapsulants was characterized two ways. First, by measuring the total equilibrium solvent uptake, and secondly, by measuring the flexural modulus of each sample both before and after swelling to determine the effect of the solvent uptake on the mechanical properties of the sample.

DERAKANE resin 470-45 or 510A was mixed with powdered e-glass fiber (about 60 wt % final), BEE (0.2 wt %) and BP (0.1 wt %) and polymerized in 6.5 mm polyethylene vials illuminated from above using a 1000 W mercury arc lamp (Oriel Corporation, Model 6293) with an intensity of 200 mW/cm$^2$ UVA. After illuminating for 8 minutes, the photopolymerized samples were removed from the vials and were stored at room temperature in the absence of light.

The chemical resistance of the cured samples to various solvents was determined using the ASTM D 1308 method. In these studies, the photopolymerized samples made from DERAKANE 470-45 and 510A were placed in solvent, and solvent uptake was recorded daily for a period of seven days to ensure that the system reached equilibrium. Solvents for these experiments included neutral (deionized) water, acidic water (10% HCl), basic water (10% NaOH), acetone, and ethanol.

Figure 17:
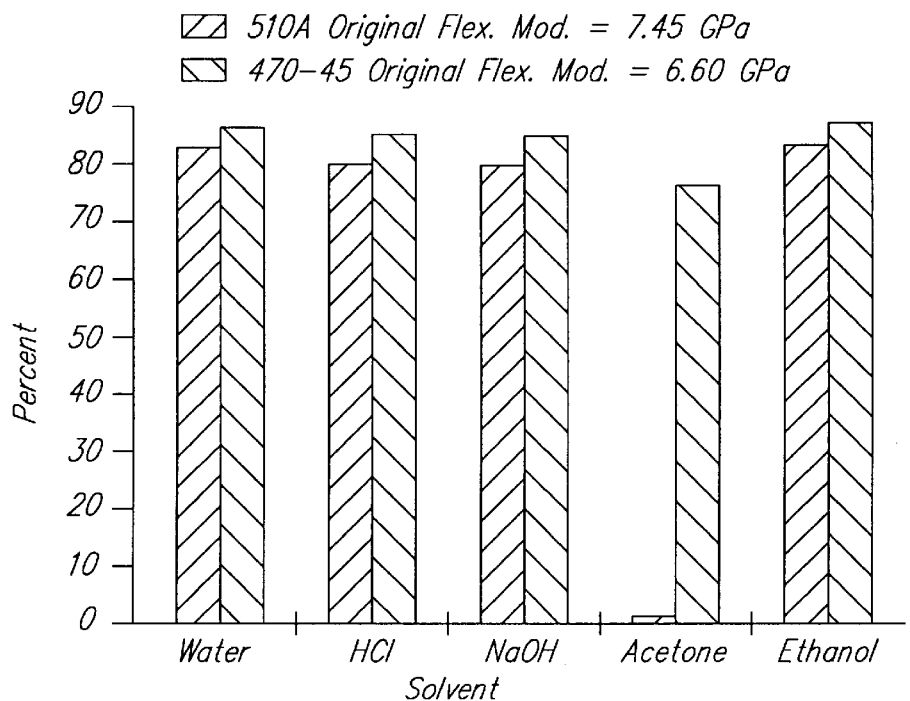
FIG. 17 is a bar graph showing the effects of solvents on the flexural modulus of photopolymerized samples based on DERAKANE resins 470-45 and 510A.

The equilibrium swelling studies revealed that the photocured samples exhibited excellent resistance to neutral, basic, and acidic water, as well as ethanol with less than 0.4 wt % uptake of each of these solvents. Only the acetone led to significant solvent uptake after a week with 3 wt % for 470-45, and 25 wt % for 510A. Moreover, as illustrated in FIG. 17, the photocured samples exhibited relatively little change in mechanical properties after swelling in all solvents except acetone. The modulus of the photocured samples after swelling was in excess of the requirements for microelectronic encapsulants with the lone exception being the 510A resin swollen in acetone.

EXAMPLE 19

This example illustrates the high thermal degradation temperature of the photopolymerizable composites of the present invention. High degradation temperatures are desirable for microelectronic encapsulants since the devices may attain elevated temperatures during assembly (e.g. soldering operations) and service (typically not in excess of ~85° C.). It is important that the encapsulant retains its thermal, mechanical, and electrical properties after extended periods of these temperatures.

Thermogravimetric analysis was performed using a DuPont model 9900 thermal analysis system in order to determine the degradation temperature of the photocured samples. The experiments were conducted on 6.5 mm thick samples of neat (unfilled) resin. Each sample was cured for 8 minutes under the 1000 W Hg(Xe) lamp prior to the experiment. The weight of the sample was recorded as the sample was heated from room temperature to 500° C. using a standard heating rate of 10° C. per minute.

The photocured encapsulants of the present invention are highly crosslinked and remain in the glassy state up to the degradation temperature. Moreover, the thermal gravimetric analysis studies revealed that the photocured samples based upon all of the DERAKANE resins exhibited degradation temperatures between 360 and 400° C. Therefore, the polymers are thermally stable well above the operating temperatures for microelectronic devices.

EXAMPLE 20

This example shows the determination of the coefficient for thermal expansion of the photopolymerizable composition of the present invention. The coefficient of thermal expansion (CTE) is defined as the ratio of the change in dimensions of the sample to the change in temperature per unit initial length. Tummala, R. R. et al., *Microelectronics Packaging Handbook*, Van Nostrand Reinhold, New York, N.Y. (1989). This parameter is very important in semiconductor encapsulation because a significant CTE mismatch between the encapsulant and the silicon chip can lead to the build up of internal stresses in the semiconductor device, and could lead to cracking of the chip or encapsulant. Current encapsulants exhibit CTE values in the range of 15–35 $\mu$m/m° C. while silicon has a value of 3–4 $\mu$m/m° C. Kinjo, N. et al., *Advances in Polymer Science* 88:5 (1989).

DERAKANE resin 470-45, 441 or 411 was mixed with either 60 wt % e-glass filler and 0.2 wt % BEE or 60–70 wt % fused silica and 0.2 wt % BAPO. Samples containing BEE as the photoinitiator were polymerized in 6.5 mm polyethylene vials using a 1000 W mercury arc lamp with an intensity of 200 mW/cm$^2$ UVA. The samples containing fused silica as the filler and BAPO as the photoinitiator were illuminated from above with light from a 3000 W arciess mercury vapor lamp (Fusion UV Systems, model F450T). These cylindrical samples, which were 17 mm in height and had a diameter of 8.5 mm, were illuminated for a relatively short time (2.5 or 3 minutes) with light of 180 mW/cm$^2$ UVA intensity.

The coefficient of thermal expansion ($\alpha$1) was measured using a DuPont 943 thermomechanical analyzer interfaced with a DuPont model 9900 thermal analyzer controller. The photopolymerized samples were cut to a thickness of 13 mm using a diamond saw and then heated from room temperature (23° C.) to 160° C. at a constant rate of 2° C./min. The change in the sample thickness during heating was recorded and α1 was obtained from the inclined line connecting two points on the curve.

Figure 18:
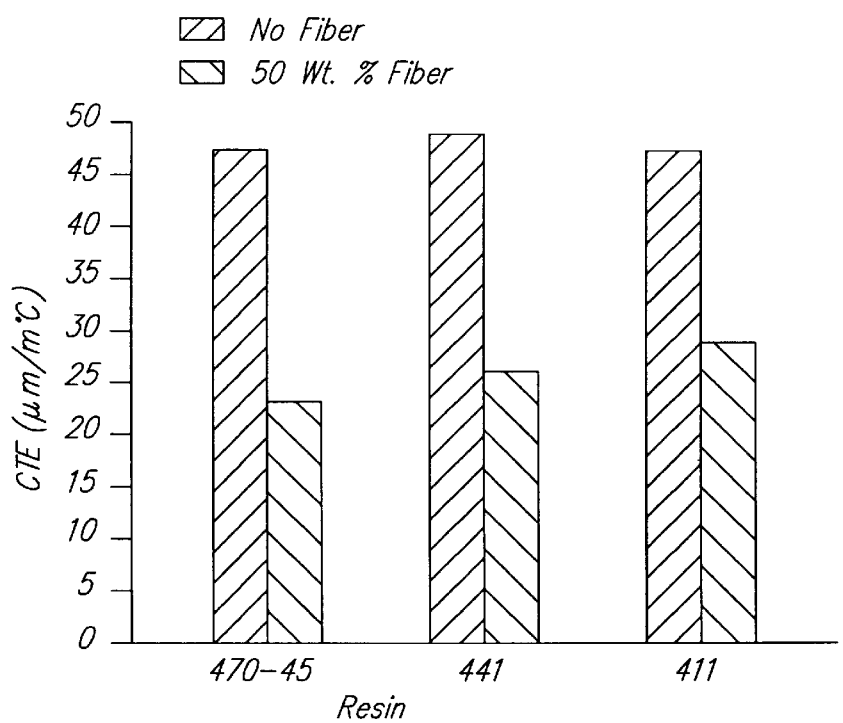
FIG. 18 is a graph showing the effect of filler loading on the coefficient of thermal expansion for photopolymerized samples based on three different DERAKANE resins.

The coefficient of thermal expansion of photocured samples with 0 and 50 wt % powdered e-glass fibers are shown in FIG. 18. The values were obtained from the slope of the line connecting data points at 30° C. and 40° C. on the thermal mechanical analysis curve. As FIG. 18 illustrates, the samples with 50 wt % filler are easily within the range of the 15–35 μm/m° C. of current commercial encapsulants.

Further CTE studies were conducted on samples prepared with DERAKANE 470-45 filled with 60 wt % fused silica. In addition, these samples were photocured using BAPO as the photoinitiator as it is photobleached more effectively than BEE. The resulting samples exhibited coefficients of thermal expansion that were more than 10% lower than those obtained for samples filled with e-glass. The CTE values for samples containing 70% fused silica were between 17 and 19 μm/m° C. Thus the photopolymerizable formulations of the present invention have CTE values meeting the requirements for application as microelectronic encapsulants.

EXAMPLE 21

This example presents the dielectric constant of the photopolymerizable composite of the present invention. The dielectric constant is a material property that describes the material's ability to store charge when used as a capacitor dielectric. Tummala, R. R. et al., *Microelectronics Packaging Handbook*, Van Nostrand Reinhold, New York, N.Y. (1989). It is equal to the charge stored in a capacitor with free space (vacuum) as the dielectric divided by the charge stored when the material in question is used as the capacitor dielectric. Low dielectric constants are desired for encapsulants of advanced, high-frequency semiconductor devices because they provide enhanced performance by allowing faster signal propagation. Manzione, L. T., *Plastic Packaging of Microelectronic Devices*, Van Nostrand Reinhold, New York, N.Y. (1990).

The dielectric constant of the photopolymerized samples was measured using the material-cavity perturbation technique. In this technique, a cylindrical brass cavity was continuously tuned to efficiently couple with a microwave circuit in a $TM_{012}$ mode at a single frequency of 2.45 GHz. Photopolymerized samples were placed in a cylindrical Teflon holder (I.D.=10 mm, height=40 mm) and the Teflon holder was hung by nylon thread in a location where the frequency shift was a maximum. The cavity with the empty Teflon holder is called an unloaded cavity, while the cavity with the photopolymerized sample is called a loaded cavity. Q factor and resonant frequency of the unloaded and loaded cavity were continuously measured to determine dielectric properties.

The dielectric constant was measured for encapsulant samples based upon the DERAKANE 470-45 resin filled with 60 wt % fused silica. The samples for these studies were photopolymerized using 0.2 wt % BAPO as the photoinitiator. The efficient photobleaching of this initiator resulted in a more rapid cure than was previously possible using other photoinitiators (such as BEE). For example, the samples used in this study were 17 mm thick and were completely cured in two to three minutes when illuminated with 180 mW/cm² UVA light.

The dielectric constant of samples cured for three minutes were 3.22 at 2.45 GHz. A typical value of the dielectric constant of the current, highly-filled microelectronic encapsulants is in the range of 3.2 to 4. Therefore, the photopolymerizable encapsulants exhibit a dielectric constant in the proper range for this application.

EXAMPLE 22

The photopolymerizable composition of the present invention can be used for encapsulating microelectronic devices by transfer molding techniques. The microelectronic device is placed into the cavity of a mold designed to give the desired thickness of encapsulant, according to the use of the final product. The mold has at least one side that will allow light to penetrate into the cavity of the mold. The mold is then filled completely at room temperature in the absence of light with the photopolymerizable composition of the present invention. After the mold has filled, polymerization is initiated by photochemical processes or by a combination of thermal and photochemical processes. The photopolymerization is initiated by ultraviolet light entering the mold through the appropriately placed window(s) transparent to the initiating wavelength. The heat released due to the exothermic reaction when photopolymerization occurs will trigger the thermal initiator when present. In this manner, the photopolymerizable compositions will polymerize rapidly to completion in a few minutes. Finally, after curing, the encapsulated device is removed from the mold.

EXAMPLE 23

The photopolymerizable composition of the present invention can be used for encapsulating microelectronic devices by glob top encapsulation. The desired amount of the photopolymerizable composition is deposited on the surface of the microelectronic device in the absence of light. Photopolymerization is then initiated by exposing the device with the composition to the appropriate light source until the encapsulating material is cured. A thermal initiator may also be present, and the heat released during the exothermic reaction of photopolymerization will trigger the thermal initiator.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

All references cited herein including literature references and patents are incorporated by reference as if fully set forth.

We claim:

1. A method for encapsulating a microelectronic device, comprising:

(a) placing said microelectronic device into a mold having a cavity, a place for said microelectronic device within said cavity, and at least one side allowing light to penetrate into the cavity;

(b) filling said mold with a photopolymerizable composition comprising at least one monomer to be photopolymerized to a polymer, a photoinitiator having a self-eliminating absorbance, and a filler, wherein said monomer does not have unduly facile extractable hydrogens so as to adversely affect the Photopolymerization and said monomer and polymer have minimal absorbance in the wavelength range where polymerization is initiated;

(c) initiating polymerization of said photopolymerizable composition by exposing said composition in said mold to light in an ultraviolet wavelength range where photopolymerization is initiated, and such that the light penetrates into the cavity of said mold; and (d) exposing said photopolymerizable composition to said light for a time adequate to cure said composition throughout.

2. The method of claim 1, wherein said monomer is an epoxy vinyl ester.

3. The method of claim 1, wherein said photoinitiator is benzoin ethyl ether.

4. The method of claim 3, wherein said benzoin ethyl ether is present in an amount of about 0.2 weight percent based upon the total weight of the photopolymerizable composition.

5. The method of claim 1, wherein said photoinitiator is bis(2,4,6-trimethylbenzoyl)phenylphosphine oxide.

6. The method of claim 5, wherein said bis(2,4,6-trimethylbenzoyl)phenylphosphine oxide is present in an amount of about 0.2 weight percent based upon the total weight of the photopolymerizable composition.

7. The method of claim 1, wherein said filler is powdered E-glass fibers or fused silica.

8. The method of claim 7, wherein said filler is present in an amount of about 50 to about 80 weight percent based upon the total weight of the photopolymerizable composition.

9. The method of claim 7, wherein said filler is present in an amount of about 60 weight percent based upon the total weight of the photopolymerizable composition.

10. The method of claim 7, wherein said filler is present in an amount of about 70 weight percent based upon the total weight of the photopolymerizable composition.

11. The method of claim 1, wherein the said ultraviolet wavelength range is about 320 to about 360 nm.

12. The method of claim 1, wherein the said microelectronic device is a semiconductor.

13. A method for encapsulating a microelectronic device, comprising:

(a) placing said microelectronic device into a mold having a cavity, a place for said microelectronic device within said cavity, and at least one side allowing light to penetrate into the cavity;

(b) filling said mold with a photopolymerizable composition comprising at least one monomer to be photopolymerized to a polymer, a photoinitiator having a self-eliminating absorbance, a thermal initiator, and a filler, wherein said monomer does not have unduly facile extractable hydrogens so as to adversely affect the photopolymerization and said monomer and polymer have minimal absorbance in the wavelength range where polymerization is initiated;

(c) initiating polymerization of said photopolymerizable composition by exposing said composition in said mold to light in an ultraviolet wavelength range where photopolymerization is initiated, and such that the light penetrates into the cavity of said mold; and (d) exposing said photopolymerizable composition to said light for a time adequate to cure said composition throughout.

14. The method of claim 13, wherein said thermal initiator is benzoyl peroxide.

15. A method for encapsulating a microelectronic device, comprising:

(a) applying a photopolymerizable composition on said microelectronic device wherein said photopolymerizable composition comprises at least one monomer to be photopolymerized to a polymer, a photoinitiator having a self-eliminating absorbance, and a filler, wherein said monomer does not have unduly facile extractable hydrogens so as to adversely affect the photopolymerization and said monomer and polymer have minimal absorbance in the wavelength range where Polymerization is initiated;

(b) initiating polymerization of said photopolymerizable composition by exposing said composition to light in an ultraviolet range where photopolymerization is initiated; and (c) exposing said photopolymerizable composition to said light for a time adequate to cure said composition.

16. The method of claim 15, wherein said monomer is an epoxy vinyl ester.

17. The method of claim 15, wherein said photoinitiator is benzoin ethyl ether.

18. The method of claim 17, wherein said benzoin ethyl ether is present in an amount of about 0.2 weight percent based upon the total weight of the photopolymerizable composition.

19. The method of claim 15, wherein said photoinitiator is bis(2,4,6-trimethylbenzoyl)phenylphosphine oxide.

20. The method of claim 19, wherein said bis(2,4,6-trimethylbenzoyl)phenylphosphine oxide is present in an amount of about 0.2 weight percent based upon the total weight of the photopolymerizable composition.

21. The method of claim 15, wherein said filler is powdered E-glass fibers or fused silica.

22. The method of claim 21, wherein said filler is present in an amount of about 50 to about 80 weight percent based upon the total weight of the photopolymerizable composition.

23. The method of claim 21, wherein said filler is present in an amount of about 60 weight percent based upon the total weight of the photopolymerizable composition.

24. The method of claim 21, wherein said filler is present in an amount of about 70 weight percent based upon the total weight of the photopolymerizable composition.

25. The method of claim 15, wherein the said ultraviolet wavelength range is about 320 to about 360 nm.

26. The method of claim 15, wherein the said microelectronic device is a semiconductor.

27. A method for encapsulating a microelectronic device, comprising:

(a) applying a photopolymerizable composition on said microelectronic device wherein said photopolymerizable composition comprises at least one monomer to be photopolymerized to a polymer, a photoinitiator having a self-eliminating absorbance, a thermal initiator, and a filler, wherein said monomer does not have unduly facile extractable hydrogens so as to adversely affect the photopolymerization and said monomer and polymer have minimal absorbance in the wavelength range where polymerization is initiated;

(b) initiating polymerization of said photopolymerizable composition by exposing said composition to light in an ultraviolet range where photopolymerization is initiated; and (c) exposing said photopolymerizable composition to said light for a time adequate to cure said composition.

28. The method of claim 27, wherein said thermal initiator is benzoyl peroxide.

* * * * *

UNITED STATES PATENT AND TRADEMARK OFFICE
CERTIFICATE OF CORRECTION

PATENT NO : 6,099,783

DATED : August 8, 2000

INVENTOR(S) : Scranton et al.

It is certified that error appears in the above-identified patent and that said Letters Patent are hereby corrected as shown below:

Columns 11-12, In the diagram, delete the two asterisks not in the application.

Column 12, line 31, Delete "mount" and insert --amount--

Column 12, line 32, Delete "eight" and insert --weight--

Column 12, line 34, Delete "mounts" and insert --amounts--

Column 14, line 7, After "Step 2" insert --(Fig. 1B)--

Column 14, line 28, Delete "nitrites" and insert --nitriles--

Column 15-16, In the diagram, delete the + and two x's after the brackets, and insert asterisks in their places.

Column 17, line 47, Delete "eq." and insert --e.g.--

Column 21, line 33, Delete "he" and insert --the--

Column 26, line 57, Delete "arciess" and insert --arcless--

Signed and Sealed this

Twenty-ninth Day of May, 2001

*Attest:*

NICHOLAS P. GODICI

*Attesting Officer*   *Acting Director of the United States Patent and Trademark Office*